United States Patent [19]

Andersen et al.

[11] Patent Number: 5,618,341

[45] Date of Patent: Apr. 8, 1997

[54] METHODS FOR UNIFORMLY DISPERSING FIBERS WITHIN STARCH-BASED COMPOSITIONS

[75] Inventors: Per J. Andersen; Simon K. Hodson, both of Santa Barbara, Calif.

[73] Assignee: E. Khashoggi Industries, Santa Barbara, Calif.

[21] Appl. No.: 439,877

[22] Filed: May 12, 1995

Related U.S. Application Data

[63] Continuation-in-part of Ser. No. 929,898, Aug. 11, 1992, abandoned, Ser. No. 353,544, Dec. 9, 1994, Ser. No. 327,524, Oct. 21, 1994, Ser. No. 288,667, Aug. 9, 1994, Ser. No. 218,971, Mar. 25, 1994, Pat. No. 5,545,450, Ser. No. 95,662, Jul. 21, 1993, Pat. No. 5,385,764, and Ser. No. 982,383, Nov. 25, 1992, abandoned, said Ser. No. 353,544, said Ser. No. 327,524, said Ser. No. 288,667, said Ser. No. 218,971, said Ser. No. 95,662, said Ser. No. 982,383, each is a continuation-in-part of Ser. No.929,898.

[51] Int. Cl.⁶ .................... C09D 7/12; C09D 103/02; C09D 105/00

[52] U.S. Cl. .................. 106/287.35; 106/162.5; 106/162.51; 106/164.01; 106/205.01; 106/206.1

[58] Field of Search ............... 106/163.1, 209, 106/162.5, 162.51, 164.01, 205.01, 206.1, 287.35

[56] References Cited

U.S. PATENT DOCUMENTS

| 2,432,971 | 12/1947 | Ruthman et al. |
| 2,968,561 | 1/1961 | Birnkrant |
| 3,042,578 | 7/1962 | Denning |

(List continued on next page.)

FOREIGN PATENT DOCUMENTS

| 0118240B1 | 9/1984 | European Pat. Off. |
| 0265745A2 | 5/1988 | European Pat. Off. |
| 0271853B2 | 6/1988 | European Pat. Off. |
| 304401B1 | 2/1989 | European Pat. Off. |
| 0340707A2 | 11/1989 | European Pat. Off. |
| 0370913B1 | 5/1990 | European Pat. Off. |
| 0405146B1 | 1/1991 | European Pat. Off. |
| 0447797A2 | 9/1991 | European Pat. Off. |
| 453980A2 | 10/1991 | European Pat. Off. |
| 0546956A2 | 6/1993 | European Pat. Off. |
| 551954A2 | 7/1993 | European Pat. Off. |
| 0556774A2 | 8/1993 | European Pat. Off. |
| 0608031A1 | 7/1994 | European Pat. Off. |
| 1278195 | 10/1961 | France |
| 0006390A1 | 1/1980 | France |
| 3346970A1 | 7/1985 | Germany |
| 3420195A1 | 12/1985 | Germany |
| 4008862C1 | 4/1991 | Germany |
| 63-22636 | 1/1988 | Japan |
| 5-105815 | 4/1993 | Japan |
| 5-171049 | 7/1993 | Japan |
| 5-246417 | 9/1993 | Japan |
| 5-320401 | 12/1993 | Japan |
| 60-32386 | 2/1994 | Japan |
| 6-32386 | 2/1994 | Japan |
| 6-135487 | 5/1994 | Japan |
| 9100590 | 11/1992 | Netherlands |
| 2050459 | 1/1981 | United Kingdom |
| 1584387 | 2/1981 | United Kingdom |
| 2214516 | 6/1989 | United Kingdom |
| 2208651 | 12/1989 | United Kingdom |
| WO87/00828 | 2/1987 | WIPO |
| WO89/02225 | 3/1989 | WIPO |
| WO91/12186 | 8/1991 | WIPO |
| WO92/04408 | 3/1992 | WIPO |
| WO93/01242 | 1/1993 | WIPO |
| WO94/18388 | 8/1994 | WIPO |
| WO94/18384 | 8/1994 | WIPO |

OTHER PUBLICATIONS

Andersen, *Control and Monitoring of Concrete Production A Study of Particle Packing and Rheology*, The Danish Academy of Technical Sciences (1990). no month available.

Andersen, *Effect of Organic Superplasticizing Admixtures and Their components on Zeta Potential and Related Properties of Cement Materials*, Pennsylvania State University (1987). no month available.

Davidson et al, *Water Soluble Resins*, New York: Reinhold Publishing Corp., Chapman & Hall, Ltd., London. no date available.

Fedors and Landel, *An Empirical Method of Estimating the Void Fraction in Mixtures of Uniform Particles of Different Size*, Powder Technology, 23, 225–231 (1979). no month available.

Furnas, *Grading Aggregates, I–Mathematical Relations for Beds of Broken Solids of Maximum Density*, Industrial and Engineering Chemistry (Sep. 1931). no month available.

Greminger, Jr. and Krumel, *Alkyl and Hydroxyalkylalkylcellulose*, Dow Chemical U.S.A., Midland, Oregon. no date available.

(List continued on next page.)

*Primary Examiner*—David Brunsman
*Attorney, Agent, or Firm*—Workman, Nydegger & Seeley

[57] ABSTRACT

Compositions and methods for substantially uniformly dispersing fibers throughout a starch-based composition. The fibers are dispersed throughout the composition by means of a high yield stress, high viscosity fluid fraction formed by interacting together water and a thickening agent such as gelatinized starch. The well-dispersed fibers provide for a large variety of processing conditions in the manufacture of articles from such starch-based compositions (e.g., greater variations in the use of water, the amount of water that must be removed to yield a form stable article, and wall thickness). Articles formed thereby have greatly improved mechanical properties as a result of the reinforcing effect of the uniformly dispersed fibers. The fibers preferably have an average length of at least about 2 mm and an aspect ratio of at least about 25:1. Other admixtures may be added to the starch-based compositions upon dispersing the fibers, such as ungelatinized starch, rheology-modifying agents, mold-release agents, inorganic fillers, hydraulically settable binders, plasticizers, integral coating or sealing materials, and dispersants.

54 Claims, 11 Drawing Sheets

U.S. PATENT DOCUMENTS

| | | |
|---|---|---|
| 3,052,595 | 9/1962 | Pye . |
| 3,117,014 | 1/1964 | Klug . |
| 3,493,382 | 2/1970 | Ryan et al. . |
| 3,759,729 | 9/1973 | Fahn . |
| 3,914,359 | 10/1975 | Bevan . |
| 3,962,155 | 6/1976 | Usamoto et al. . |
| 3,968,004 | 7/1976 | Coffey et al. . |
| 4,017,324 | 4/1977 | Eggers . |
| 4,043,862 | 8/1977 | Roberts . |
| 4,044,166 | 8/1977 | Koizumi . |
| 4,070,196 | 1/1978 | Kraak et al. . |
| 4,080,213 | 3/1978 | Mori et al. . |
| 4,089,691 | 5/1978 | Cummisford et al. . |
| 4,094,077 | 6/1978 | Schrader et al. . |
| 4,124,550 | 11/1978 | Kobayashi et al. . |
| 4,149,550 | 4/1979 | Green et al. . |
| 4,172,154 | 10/1979 | von Rymon Lipinski . |
| 4,204,337 | 5/1980 | Roos et al. . |
| 4,210,490 | 7/1980 | Taylor . |
| 4,225,247 | 9/1980 | Hodson . |
| 4,225,383 | 9/1980 | McReynolds . |
| 4,230,502 | 10/1980 | Lustig et al. . |
| 4,249,991 | 2/1981 | Baes et al. . |
| 4,303,690 | 12/1981 | Haas, Sr. et al. . |
| 4,306,059 | 12/1981 | Yokobayashi et al. . |
| 4,328,136 | 5/1982 | Blount . |
| 4,329,177 | 5/1982 | George . |
| 4,333,863 | 8/1982 | Lindroth ................... 106/209 |
| 4,377,440 | 3/1983 | Gasland . |
| 4,378,271 | 3/1983 | Hargreaves et al. . |
| 4,394,930 | 7/1983 | Korpman . |
| 4,410,571 | 10/1983 | Korpman . |
| 4,438,685 | 3/1984 | Haas, Sr. et al. . |
| 4,445,970 | 5/1984 | Post et al. . |
| 4,454,268 | 6/1984 | Otey et al. . |
| 4,462,835 | 7/1984 | Car . |
| 4,508,595 | 4/1985 | Gasland . |
| 4,524,682 | 6/1985 | Haas, Sr. et al. . |
| 4,529,653 | 7/1985 | Hargreaves et al. . |
| 4,529,662 | 7/1985 | Lancaster et al. . |
| 4,529,663 | 7/1985 | Lancaster et al. . |
| 4,545,854 | 10/1985 | Gomez et al. . |
| 4,550,655 | 11/1985 | Haas, Sr. et al. . |
| 4,552,463 | 11/1985 | Hodson . |
| 4,567,049 | 1/1986 | Haas, Sr. et al. . |
| 4,588,443 | 5/1986 | Bache . |
| 4,595,623 | 6/1986 | Du Pont et al. . |
| 4,602,590 | 7/1986 | Haas, Sr. et al. . |
| 4,613,627 | 9/1986 | Sherman et al. . |
| 4,623,150 | 11/1986 | Moehlman et al. . |
| 4,624,855 | 11/1986 | Haas, Sr. et al. . |
| 4,625,856 | 12/1986 | Haas, Sr. et al. . |
| 4,648,314 | 3/1987 | Plight et al. . |
| 4,652,218 | 3/1987 | Fornandel et al. . |
| 4,669,603 | 6/1987 | Haas, Sr. et al. . |
| 4,673,438 | 6/1987 | Wittwer et al. . |
| 4,694,741 | 9/1987 | Haas, Sr. et al. . |
| 4,710,117 | 12/1987 | Haas, Sr. et al. . |
| 4,710,422 | 12/1987 | Fredenucci . |
| 4,711,669 | 12/1987 | Paul et al. . |
| 4,735,660 | 5/1988 | Cane ........................ 106/209 |
| 4,749,583 | 6/1988 | Branch . |
| 4,753,710 | 6/1988 | Langley et al. . |
| 4,755,494 | 7/1988 | Ruben . |
| 4,775,580 | 10/1988 | Dighton . |
| 4,789,244 | 12/1988 | Dunton et al. . |
| 4,814,012 | 3/1989 | Paul et al. . |
| 4,828,650 | 5/1989 | Wagle et al. . |
| 4,833,191 | 5/1989 | Bushway et al. . |
| 4,846,932 | 7/1989 | Karita et al. . |
| 4,863,655 | 9/1989 | Lacourse et al. . |
| 4,872,913 | 10/1989 | Dunton et al. . |
| 4,889,428 | 12/1989 | Hodson . |
| 4,892,590 | 1/1990 | Gill et al. . |
| 4,912,069 | 3/1990 | Ruben . |
| 4,919,758 | 4/1990 | Wagle et al. . |
| 4,921,250 | 5/1990 | Ayres . |
| 4,923,665 | 5/1990 | Andersen et al. . |
| 4,925,530 | 5/1990 | Sinclair et al. . |
| 4,927,655 | 5/1990 | Ito . |
| 4,927,656 | 5/1990 | Ito . |
| 4,941,922 | 7/1990 | Snyder . |
| 4,943,349 | 7/1990 | Gomez . |
| 4,944,595 | 7/1990 | Hodson . |
| 4,952,278 | 8/1990 | Gregory et al. . |
| 4,953,453 | 9/1990 | Haas, Sr. et al. . |
| 4,957,558 | 9/1990 | Ueda et al. . |
| 4,957,754 | 9/1990 | Munk et al. . |
| 4,963,603 | 8/1990 | Felegi, Jr. et al. . |
| 4,979,992 | 12/1990 | Bache . |
| 5,032,413 | 7/1991 | Haas et al. . |
| 5,032,414 | 7/1991 | Haas et al. . |
| 5,035,930 | 7/1991 | Lacourse et al. . |
| 5,039,003 | 8/1991 | Gordon et al. . |
| 5,039,378 | 8/1991 | Pommier et al. . |
| 5,043,196 | 8/1991 | Lacourse et al. . |
| 5,048,403 | 9/1991 | Haas, Sr. et al. . |
| 5,061,346 | 10/1991 | Taggart et al. . |
| 5,071,512 | 12/1991 | Bixler et al. . |
| 5,076,985 | 12/1991 | Koch et al. . |
| 5,082,500 | 1/1992 | Nachtman et al. . |
| 5,095,054 | 3/1992 | Lay et al. . |
| 5,103,717 | 4/1992 | Haas, Sr. et al. . |
| 5,104,487 | 4/1992 | Taggart et al. . |
| 5,104,669 | 4/1992 | Wolke et al. . |
| 5,106,880 | 4/1992 | Miller et al. . |
| 5,108,677 | 4/1992 | Ayres . |
| 5,110,413 | 5/1992 | Steer . |
| 5,122,231 | 6/1992 | Anderson . |
| 5,126,013 | 6/1992 | Wiker et al. . |
| 5,126,014 | 6/1992 | Chung . |
| 5,132,155 | 7/1992 | Singh et al. . |
| 5,134,179 | 7/1992 | Felegi, Jr. et al. . |
| 5,141,797 | 8/1992 | Wheeler . |
| 5,153,037 | 10/1992 | Altieri . |
| 5,156,718 | 8/1992 | Neubert . |
| 5,160,368 | 11/1992 | Begovich . |
| 5,160,676 | 11/1992 | Singh et al. . |
| 5,162,126 | 11/1992 | Thomer et al. . |
| 5,178,677 | 1/1993 | Haas et al. . |
| 5,178,730 | 1/1993 | Bixler et al. . |
| 5,185,382 | 2/1993 | Neumann et al. . |
| 5,186,990 | 2/1993 | Starcevich . |
| 5,194,206 | 3/1993 | Koch et al. . |
| 5,201,403 | 4/1993 | Haas, Sr. et al. . |
| 5,206,087 | 4/1993 | Tokiwa et al. . |
| 5,208,267 | 5/1993 | Neumann et al. . |
| 5,221,435 | 1/1993 | Smith, Jr. . |
| 5,224,595 | 7/1993 | Sugimoto et al. . |
| 5,240,561 | 8/1993 | Kaliski . |
| 5,248,702 | 9/1993 | Neumann et al. . |
| 5,252,271 | 10/1993 | Jeffs . |
| 5,253,743 | 10/1993 | Haas, Sr. et al. . |
| 5,256,711 | 10/1993 | Tokiwa et al. . |
| 5,258,430 | 11/1993 | Bastioli et al. . |
| 5,262,458 | 11/1993 | Bastioli et al. . |
| 5,264,030 | 11/1993 | Tanabe et al. . |
| 5,264,080 | 11/1993 | Shaw et al. . |
| 5,266,368 | 11/1993 | Miller . |
| 5,268,187 | 12/1993 | Quinlan . |
| 5,269,845 | 12/1993 | Grunau et al. . |
| 5,272,181 | 11/1993 | Boehmer et al. . |

| | | |
|---|---|---|
| 5,273,167 | 12/1993 | Haas et al. |
| 5,273,821 | 12/1993 | Olson et al. |
| 5,275,774 | 1/1994 | Bahr et al. |
| 5,277,764 | 1/1994 | Johansson et al. |
| 5,278,194 | 1/1994 | Tickner et al. |
| 5,279,658 | 1/1994 | Aung. |
| 5,284,672 | 2/1994 | Ito. |
| 5,288,318 | 2/1994 | Mayer et al. |
| 5,288,765 | 2/1994 | Bastioli et al. |
| 5,290,350 | 3/1994 | Jakel. |
| 5,298,273 | 2/1994 | Ito. |
| 5,300,333 | 4/1994 | Wilkerson et al. |
| 5,308,879 | 5/1994 | Akamatu et al. |
| 5,314,754 | 5/1994 | Knight. |
| 5,317,037 | 5/1994 | Golden et al. |
| 5,317,119 | 5/1994 | Ayres. |
| 5,320,669 | 6/1994 | Lim et al. |
| 5,346,541 | 9/1994 | Nelles. |
| 5,360,586 | 11/1994 | Wyatt et al. |
| 5,362,776 | 11/1994 | Barenberg et al. |
| 5,362,777 | 11/1994 | Tomka. |
| 5,372,877 | 12/1994 | Kannankeril. |
| 5,411,639 | 5/1995 | Kurrle. |
| 5,500,089 | 3/1996 | Huang et al. |
| 5,506,277 | 4/1996 | Griesbach, III. |
| 5,512,090 | 4/1996 | Franke. |
| 5,512,378 | 4/1996 | Bastioli. |

OTHER PUBLICATIONS

Johansen et al., *Particle Packing and Concrete Properties*, Materials Science of Concrete II, 111–147. no date available.

McGeary, *Mechanical Packing of Spherical Particles*, Journal of the American Ceramic Society, vol. 44, No. 10 (Oct. 1961).

Osbaeck and Johansen, *Particle Size Distribution and Rate of Strength Development*, Paper for the 89th Annual Meeting of the American Ceramic Society, Inc., Pittsburgh, PA (Apr. 26–30, 1987).

Patankar and Mandal, *The Packing of Some Non-Spherical Solid Particles*, Trans. J. Brit. Ceram. Soc., 79, 59–66 (1980). no month available.

Ridgway and Tarbuck, *Particulate Mixture Bulk Densities*, Chemical and Process Engineering (Feb. 1968).

Robinson, *Extrusion Defects*. no date available.

Stovall et al., *Linear Packing Density Model of Grain Mixtures*, Powder Technology, 48 1–12 (1986). no month available.

Swientek, *Formidable Films*, Prepared Foods (Sep. 1993).

Vrana, *Khashoggi Kin Reported Planning Private Placement of Shares in New Container Firm* (Mar. 28, 1993).

Weinrich, R., *German Comes Up With Recycled Product to Replace Foam Chips*. no date available.

Westman and Hugill, *The Packing of Particles* (1930). no month available.

Biomat 32—Production Unit for Natural Packaging, *Starch Foam Dishes at Burger King's*. no date available.

*Biotec Product Literature*. no date available.

*Plastic Forming Processes*. no date available.

Sequa Chemicals, Inc., Technical Data, *Sunrez® 700 Series Insolubilizers Coating Additive*. no date available.

Staley Starch and Specialty Products Group, Technical Data, *Sta-Lok® 400 Cationic Potato Starch*. no date available.

*Thermoforming Process Guide*, Dow Plastics. no date available.

Zeneca, *Biopol. Nature's Plastic—Born from Nature. Back to Nature*. no date available.

*Zien In The Food Industry*, Freemen Industries, Inc. no date available.

METHODS FOR UNIFORMLY DISPERSING FIBERS WITHIN STARCH-BASED COMPOSITIONS

BACKGROUND OF THE INVENTION

1. Related Applications

This application is a continuation-in-part of copending U.S. application Ser. No. 08/353,544, entitled "Methods and Systems for Manufacturing Articles Having a Starch-Bound Cellular Matrix Reinforced with Uniformly Dispersed Fibers," and filed Dec. 9, 1994, in the names of Per Just Andersen, Ph.D. and Simon K. Hodson. This application is also a continuation-in-part of copending U.S. application Ser. No. 08/327,524, entitled "Compositions and Methods for Manufacturing Fiber-Reinforced, Starch-Bound Articles Having a Foamed Cellular Matrix," and filed Oct. 21, 1994, in the names of Per Just Andersen, Ph.D. and Simon K. Hodson. This application is also a continuation-in-part of copending U.S. application Ser. No. 08/288,667, entitled "Methods and Systems for Manufacturing Containers and Other Articles Having an Inorganically Filled, Starch-Bound Cellular Matrix," and filed Aug. 9, 1994, in the names of Per Just Andersen, Ph.D. and Simon K. Hodson. This application is also a continuation-in-part of U.S. application Ser. No. 08/218,971, entitled "Methods of Molding Articles Having an Inorganically Filled Organic Polymex Matrix," and filed Mar. 25, 1994, in the names of Per Just Andersen, Ph.D. and Simon K. Hodson, now issued U.S. Pat. No. 5,545,450. This application is also a continuation-in-part of U.S. application Ser. No. 08/095,662, entitled "Hydraulically Settable Containers and Other Articles for Storing, Dispensing, and Packaging Food and Beverages and Methods for Their Manufacture," and filed Jul. 21, 1993, in the names of Per Just Andersen, Ph.D. and Simon K. Hodson, now issued U.S. Patent No. 5,385,764. This application is also a continuation-in-part of U.S. application Ser. No. 07/982,383, entitled, "Food and Beverage Containers Made from Inorganic Aggregates and Polysaccharide. Protein, or Synthetic Organic Binders, and the Methods of Manufacturing Such Containers," and filed Nov. 25, 1992, in the names of Per Just Andersen, Ph.D. and Simon K. Hodson (now abandoned). This application, as well as each of the foregoing applications, is also continuation-in-part of U.S. patent application Ser. No. 07/929,898, entitled "Cementitious Food and Beverage Storage, Dispensing, and Packaging Containers and the Methods of Manufacturing Same," and filed Aug. 11, 1992, in the names of Per Just Andersen, Ph.D. and Simon K. Hodson (now abandoned). For purposes of disclosure of the present invention, each of the foregoing applications is incorporated herein by specific reference.

2. The Field of the Invention

The present invention relates to methods for uniformly dispersing fibers within starch-based compositions. More particularly, the present invention relates to the use of a high yield stress, high viscosity fluid system in order to obtain homogeneous dispersion of fibers, including longer-length fibers of high aspect ratio. The uniformly dispersed fibers reinforce starch-bound matrices and articles formed from such compositions and at least substantially reduce the need for adding synthetic polymers.

3. The Relevant Technology

A. Conventional Materials

Thermoplastic materials, or so called "plastics", as well as other materials like paper, polystyrene, or metals, are presently used in enormous quantity in the manufacture of articles, particularly disposable articles, such as containers, dividers, lids, utensils, cans, packaging supports, and other packaging materials used to protect, store, package, dispense, or ship an enormous variety of liquid and solid goods. Containers and other packaging materials protect goods from environmental influences and distribution damage, particularly from gases, moisture, light, microorganisms, vermin, physical shock, crushing forces, vibration, leaking, or spilling.

Consciousness-raising organizations have led a debate as to which of the conventional materials used to make such containers and other articles (e.g., thermoplastics, paper, polystyrene, glass, or metal) is most damaging to the environment, or which is more enviromnentally "correct." The debate often misses the point that each of these materials has its own unique environmental weaknesses. One faction will frequently tout a particular material as being superior to another when viewed in light of a particular environmental problem, while unknowingly (or even knowingly) ignoring different, often larger, problems associated with the supposedly "environmentally friendly" material. In reality, the debate should not be directed to which of these materials is more or less harmful to the environment, but rather toward asking: "Can we discover or develop an alternative material which will solve most, if not all, of the various environmental problems associated with each of these presently used materials?"

B. Starch-based Materials

Due to the more recent awareness of the tremendous environmental impact of using paper, thermoplastics, polystyrene, or metals for a variety of single-use, mainly disposable, articles such as containers and other packaging materials (not to mention the ever mounting political pressures), there has been an acute need (long since recognized by those skilled in the art) to find environmentally superior or improved substitute materials. Many have attempted to manufacture articles using starch, which is a natural, plentiful, and renewable resource, or starch-containing compositions. Starch can be processed in essentially two uniquely different manners: (1) it can be gelated in water, which is analogous to dissolving a solid within a liquid solvent, and then dried out to form a solidified material through what has been characterized as a "retrogradation" process; or (2) it can be melted and then cooled to form a solidified material, much like a thermoplastic material.

In the gelation/retrogradation process, the starch-containing mixture is generally formed between heated molds for a period of time sufficient to gelate the starch-based binder and obtain a solidified or semi-hardened material through the removal of water by evaporation. Depending on the initial and final water contents, processing conditions, and other variables, the molded starch-bound articles formed by gelation can have a wide range of densities and strength properties. Because such articles are largely starch-bound, they are readily biodegradable.

However, the manufacture of starch-based articles by gelation/retrogradation has a number of drawbacks, including relatively high molding times, relatively high starch requirements, relatively high minimum mass and thickness requirements, expensive equipment, and either the addition of a synthetic polymer or a time-consuming "conditioning step" followed by a coating step in order to maintain the proper moisture balance in order to impart strength, toughness, and flexibility to the articles. Most importantly, starch-bound articles tend to be quite brittle. Because of the need to remove virtually all of the water from the entire starch-bound article during molding, it has heretofore been difficult, if not impossible, to manufacture articles of varying cross-sectional thickness. As a result, the manufacture of starch-based articles by gelation has heretofore been far more expensive than simply making articles from conventional thermoplastics.

Attempts have been made to add fibers to starch-based compositions in order to increase the strength of the molded article, although with only limited success. Longer-length fibers (>2 mm) or fibers of higher aspect ratio (>25:1) have not been used in appreciable quantities to strengthen the molded articles because of the difficulty of obtaining adequate dispersion of such fibers. In fact, the addition of longer-length fibers has usually resulted in no improved properties or even a weaker article because of poor dispersion, clumping, and/or segregation of the fibers from the starch-based liquid component of the starting composition, regardless of the amount of water used. As a result, the conventional wisdom has been to increase the water content in order to obtain better fiber dispersion: e.g., the manufacture of conventional paper in which fibrous slurries containing up to 99.5% water are used. Even the addition of large quantities of water in the aforementioned starch-based compositions (up to 80% in some cases) did not result in adequate dispersion of fibers of any length. Moreover, the inclusion of large amounts of water thought to be necessary to disperse the fibers, even shorter-length fibers, increased the production cost of the articles because of the increased time and energy required to remove the additional water from the formed product.

In addition to the relatively simple gelation/retrogradation process outlined above, some have attempted to treat starches like a thermoplastic material, with only moderate success: e.g., the "hot melt" process, or the "destructurization" of starch. In contrast to the gelation/retrogradation process in which a starch-based binder is gelated with water and then solidified through the evaporative removal of water, hot melted or "destructurized" starch involves heating starch under conditions of very high pressure to above the melting point of the starch, thereby creating a liquified starch melt, which can solidify by cooling the hot melt to below the "glass transition temperature." Two drawbacks immediately show themselves: (1) starch can only go through a melt by heating it under elevated pressure (otherwise the starch will simply gelate or decompose); and (2) the hot melt cannot be solidified through the evaporative removal of water. Also, because of the difficulty in obtaining a hot melt from starch having adequate flow properties, it is generally necessary to add a flux, such as a synthetic polymer or plasticizer and/or water. However, if water is used, it is necessary to further increase the pressure of the system to prevent the water from boiling out of the hot melt mixture.

One of the purposes of the hot-melt or destructurization method is an attempt to obtain higher strength from the solidified starch through the alignment of the amylose chains, which are generally more randomly oriented in the gelation/retrogradation process. Because of this, only starches with relatively high amylose contents have been shown to yield adequately strong articles. In most cases, starches having a minimum amylose content of 45% have been required. Nevertheless, even if a high amylose starch is used and alignment of the amylose chains has been accomplished, the final molded starch-based articles still tend to be brittle and extremely sensitive to moisture from the air, which can disrupt the alignment of the amylose chains over time. In order to strengthen the destructurized starch article, it has been necessary to incorporate synthetic polymers in order to reinforce or soften the destructurized starch and make the article stronger and less sensitive to ambient moisture. However, because most water resistant thermoplastic polymers are also hydrophobic, and therefore not readily compatible with the generally hydrophilic starch polymers, it has been necessary to also include what might fairly be characterized as a "surfactant" polymer in order to obtain a homogeneous mixture of starch and the synthetic polymer during the hot melt stage.

Due to the extreme conditions of temperature and pressure that are required in order to obtain a hot melt, as well as the extremely high viscosities of destructurized starch, it has generally not been feasible to further increase the viscosity of the hot melt mixture by adding solid components, such as inorganic fillers or fibers. Even assuming that one were to attempt to introduce fibers into the hot melt mixture in order to obtain articles of increased strength and toughness, the extreme shear stresses that would be required to blend such fibers within the extremely viscous hot melts would be expected to cause the destruction of fibers of any appreciable length.

In light of the foregoing, what is needed are compositions and methods for manufacturing novel starch-bound materials that can replace thermoplastics and other conventional materials for producing packaging materials and other articles.

It would be a tremendous improvement in the art to provide compositions and methods for improving the dispersion of fibers within starch-based materials without the use of large quantities of water.

It would yet be a significant improvement if such methods allowed for the more thorough dispersion of fibers, particularly relatively long-length fibers (i.e., those having an average length greater than about 2 mm) and/or fibers of high aspect ratio (i.e., at least about 25:1), within starch-based compositions.

It would be a significant improvement in the art if such fiber-filled compositions and methods yielded starch-bound articles that had properties similar, or even superior, to thermoplastics and other conventional materials.

It would yet be an improvement in the art if such compositions and methods yielded hardened, starch-based articles that do not require the addition of synthetic polymers or prolonged, high-humidity conditioning in order to obtain the required strength and toughness.

It would be an additional improvement in the art to provide compositions and methods that yielded starch-bound articles that did not require the application of a coating or the inclusion of a synthetic polymer to maintain the proper moisture within the starch-bound articles.

It would be further improvement in the art to provide compositions and methods that allowed for the manufacture of starch-bound articles though a gelation/retrogradation process having varying cross-sectional thicknesses throughout the same article.

From a practical point of view, it would be a significant improvement if such compositions and methods made possible the manufacture of articles at a rate and cost that was comparable to, or even less than, existing methods of manufacturing containers or other articles from thermoplastics or other conventional materials.

It would further be a significant improvement in the art if such compositions and methods yielded articles having a similar cross-section and comparable critical mechanical properties for a specific use, such as, e.g., strength, toughness, and flexibility, compared to thermoplastics or other conventional materials.

Such starch-bound compositions having uniformly dispersed fibers and methods for making such compositions are disclosed and claimed herein.

SUMMARY AND OBJECTS OF THE INVENTION

The present invention is directed to methods for obtaining starch-based compositions having substantially uniformly dispersed fibers used in making fiber-reinforced, starch-bound articles. Uniformly dispersed fibers, especially longer-length fibers of high aspect ratio, result in articles having substantially the same amount, concentration, and distribution of fibers throughout the entire bonding matrix. This results in articles of greatly increased strength, toughness, and ductility, as well as articles which attain substantially all of their final strength, flexibility, toughness, and other critical properties immediately or shortly after being demolded without the need for subsequent processing steps or the inclusion of synthetic polymers.

The inventive method involves a fluid system having a pseudo plastic or an approximate Binghamian flow behavior (i.e., having an appropriately high yield stress) that is able to impart shear from a mechanical mixing apparatus down to the fiber level in order to obtain a starch-based composition having substantially uniformly dispersed fibers. A yield stress increasing agent is blended with water to form a fluid fraction having the requisite yield stress and other desired rheological properties. The yield stress increasing agent may comprise a variety of organic thickening agents, but preferably includes gelatinized starch. The water is included to form a fluid fraction or aqueous phase in order to gelate the starch-based thickening agent and to disperse the fibers in conjunction with the gelatinized starch-based thickening agent. Any water remaining within the starch-bound structural matrix of an article molded from the mixture helps to plasticize or soften the otherwise brittle retrograded starch within the article in order to increase the strength, flexibility, and toughness of the article.

The starch-based thickening agent can also act as a binding agent upon the evaporative removal of water. However, if it is desired to increase the concentration of binder within the starch-based composition, it is usually preferable to include a substantial amount of an ungelatinized binder, usually an unmodified starch, which will only gelate upon heating the mixture above the gelation temperature of the starch. This can occur during heat molding, in which the starch-based composition is positioned between heated dies in order to gelate the ungelatinized starch-based binder component and remove the water-based solvent by evaporation.

It has been discovered that the well-dispersed fibers of high aspect ratio (i.e., about 25:1 or greater) and preferably longer-length (i.e., at least about 2 mm) within a starch-based composition serve at least two important functions. First, and perhaps most importantly, the fibers reinforce the newly formed starch-bound matrix of the molded composition so that the molded article can be removed from the mold while retaining adequate free water within the structure of the article to plasticize the starch-bound matrix. This allows the newly demolded article to have adequate toughness and strength immediately or shortly after being demolded for its intended purpose without the need for conventional conditioning, or the inclusion of oils, plasticizers, or co-polymers, as was previously required in the manufacture of, e.g., foamed starch-based articles. This also helps to prevent the opposite but related problem of overheating or carmelization of the starch-based binder, which can occur when it is desired to remove significantly all of the water from the molded article.

Another important benefit of including well-dispersed, preferably longer-length fibers of high aspect ratio is that the molded articles show a dramatic increase in fracture energy, tensile strength, flexural strength, toughness, flexibility, and other related mechanical properties compared to conventional starch-based articles. The increase in mechanical properties is even more dramatic where significant quantities of inert fillers, such as inorganic aggregates, are included, which in the past greatly reduced the strength of the molded articles. It is the substantially uniform dispersion of fibers that allows starch-bound articles to have properties similar, or even superior to, conventional materials at about the same mass and cross sectional thickness. This allows for the manufacture of thinner-walled articles having properties superior to their much thicker-walled, starch-based counterparts, thereby greatly reducing the mass, cost, forming time, and environmental impact of the materials used to manufacture such articles. Moreover, the shortened molding times and the elimination of the previously required conditioning step greatly reduces the manufacturing costs in terms of labor, time, and energy.

It is important to understand that the ability to uniformly disperse the fibers throughout the starch-based composition is determined primarily by the rheology of the fluid fraction, as opposed to the mixture as a whole. In fact, adding solid components, such as fibers and inert fillers, to any mixture is known to increase both the yield stress and viscosity of the mixture. However, simply increasing the yield stress and viscosity of the mixture will not result in the high degree of fiber dispersion that is obtained through the use of a high yield stress fluid fraction; hence, the importance of using a gelatinized starch or other appropriate water soluble yield stress increasing agent to form the high yield stress fluid fraction.

It has been found that the yield stress of the fluid fraction used to uniformly disperse fibers within a starch-based composition can be as low as about 10 Pa, up to about 5000 Pa, and preferably in a range from about 20 Pa to about 2000 Pa. It has been found that there is a more direct correlation between the yield stress of the fluid fraction and the ability to uniformly and homogeneously disperse the fibers within a mixture than between viscosity and fiber dispersion. In fact, even highly viscous mixtures, if they have little or no yield stress, are generally unable to adequately and uniformly disperse the fibers. Nevertheless, although the viscosity of the fluid fraction is less important than maintaining the yield stress at an appropriate level, the fluid fraction will generally have a viscosity of at least about 3 Pa.s, up to about 3000 Pa.s, preferably in a range from about 5 Pa.s to about 1000 Pa.s. The foregoing and all subsequent viscosity values, unless otherwise specified, represent "apparent viscosity" values measured on a Paar-Physica viscometer at a shear rate of 5 s$^{-1}$. However, the "plastic viscosity" of the same fluid fraction of the starch-based composition, when determined by the best fit line on a flow curve at a shear rate between 60 s$^{-1}$ to 100 s$^{-1}$, will fall generally within a broad range from at least about 0.1 Pa.s, up to about 100 Pa.s, and preferably in a range from about 0.25 Pa.s to about 100 Pa.s.

Because the only essential limitation to obtaining substantially uniform dispersion of fibers is that the fibers be dispersed by means of a high yield stress, high viscosity fluid fraction, the order of mixing the components together is less important. For example, it may be preferable in some cases to prepare the high yield stress fluid fraction by gelating the starch-based thickening agent in water and then adding the fibers to be dispersed within the fluid fraction. Conversely, it may be advantageous to partially disperse the fibers in water, at least to break up the larger nodules, and thereafter add a pregelatinized starch-based thickening agent to the water. Similarly, an unmodified starch may be added to the water/fiber mixture, which is then heated to the gelation temperature to gelate the unmodified starch in order to raise the yield stress and viscosity of the fluid fraction to the appropriate levels to obtain adequate fiber dispersion. In some cases it may be desirable to add other admixtures and solid components to the mixture either before, during or after the fiber dispersion process; the only limitation is that the fluid fraction of the overall mixture have the appropriate yield stress and viscosity during the dispersion step independent of the overall yield stress and viscosity of the total mixture.

Once the fibers have been uniformly dispersed, regardless of the mixing order, the viscosity and yield stress of the starch-based composition may be altered as needed to prepare a desired moldable composition. Other components and admixtures may be added to, e.g., regulate the rheology of the starch-based composition and impart desired mechanical and other physical properties to the final molded articles. These include ungelatinized starch-based binders, rheology-modifying agents, hydraulically settable binders, inert fillers, dispersants, mold release agents, humectants, plasticizers, integral sealants, cross-linking agents, thickeners, co-solvents, etc.

Because the addition of additional solids will tend to increase both the viscosity and yield stress of the moldable composition (though not of the fluid fraction, assuming only negligible water absorption), the viscosity of the moldable composition can optionally be reduced by, e.g., adding additional water and/or a dispersant once the fibers have been dispersed. The viscosity and yield stress of the fluid fraction must remain sufficiently high, however, to maintain substantially uniform dispersion of fibers or other solid components before and during the molding process.

The inability of conventional practices to obtain adequate dispersion of high aspect ratio fibers within water solvated systems, particularly fibers having an average length greater than about 2 mm, is primarily due to the inability of the generally low viscosity Newtonian fluid fractions (i.e., those that have little or no yield stress) to transfer the shearing force or energy from the mixer to the fibers. Instead, the energy in such mixtures is dissipated within the churning aqueous solvent (or other Newtonian fluid fraction) because of the tendency of the nonviscous water to yield or flow in the direction of the shearing force without transferring such energy to the fibers or fibrous clumps. Thus, adding progressively greater amounts of water generally did not substantially improve the ability of such mixtures to thoroughly disperse or blend the fibers throughout the aqueous slurry.

Moreover, increasing the water content only leads to greater segregation between the fibers and fluid fraction during the molding process, which leads to poorly formed articles of greatly diminished strength and structural integrity. Similarly, simply increasing the shear rate or shear energy of the mixing apparatus does not appreciably improve the ability to disperse fibers, particularly longer-length fibers. In fact, the converse is often true: increasing the shear rate of the mixer can lead to clumping and entanglement of the fibers and the formation of fibrous nodules. In any event, greatly increasing the initial water content will greatly increase the time and energy, and hence the cost, of removing water from such compositions during the forming process.

In contrast to mixtures containing high water, the shear imparted at the fiber level by the high yield stress, high viscosity fluid fraction obtained using the inventive compositions and methods pulls apart and separates the fibers, while continued mixing disperses the fibers throughout the fluid fraction. The inventive method allows for the previously unattainable homogeneous dispersion of fibers having a high aspect ratio (>25:1) and average length (>2 mm), and allows for the dispersion of fibers having average fiber lengths of at least about 3.5 mm, 6.5 mm, and 10 mm, even up to about 25 mm or longer.

Any mixing procedure or apparatus that can impart adequate shearing action to effect homogeneous mixing of fibers within the inventive high yield stress fluid function can be used. The only limitation is that the mixing procedure and apparatus used to disperse the fibers and then form the final moldable composition should have adequate shear to thoroughly blend the components without damaging the fibers and other solid components or entraining unwanted air pockets within the mixture.

The preferred starch component (whether gelatinized to increase the yield stress of the fluid fraction or ungelatinized to create the bonding matrix upon heat molding) typically may include any starch, such as potato starch, corn starch, waxy corn starch, rice starch, waxy rice starch, wheat starch, their grain predecessors, e.g., flour and cracked grains, or their modified counterparts. Unmodified starches are generally preferred for the ungelatinized starch component because they will only gelate after the moldable mixture has been raised to the gelation temperature of the unmodified starch during the molding process, thereby providing a means for controlling the timing, rate, and extent of gelation. In addition, they are usually far less expensive than modified starches. The substitution of naturally produced, but generally overabundant and very low-valued unmodified starches, on the one hand, for the petroleum-based or synthetically produced plastics, polystyrene, and other polymers used in the manufacture of conventional materials, on the other, further illustrates the tremendously positive environmental impact of the fiber-reinforced, starch-bound materials of the present invention.

In many conventional uses of starch, such as the hot-melt or destructurized starch technique, in which the starch is heated under elevated temperature and extreme pressure in the presence of minimal water, it has been necessary to use more expensive starches having a relatively high amylose content (greater than 45% by weight). This is in sharp contrast to the starch-based binders used in the present invention, in which the contribution by the starch-based binder to the mechanical properties of the final molded article is largely independent of the amylose content. In fact, the two most preferred starch-based binders, namely unmodified waxy corn starch and potato starch, have a relatively low amylose content (1–3% and 20–25%, respectively).

Any fiber that has the effect of strengthening and/or toughening the articles formed by the inventive methods taught herein is within the scope of the present invention. Nevertheless, fibers having an average length of at least about 2 mm and an average aspect ratio of at least about 25:1 are preferred. One preferred fibrous material is softwood fiber, which has an average length of about 3.5 mm. Longer-length fibers are preferred over shorter-length fibers because of their ability to carry loads or dissipate shocks throughout the starch-bound structural matrix. Nevertheless, fibers of shorter-length can be employed, either alone or in combination with longer fibers, as long as an aspect ratio of at least about 25:1 is maintained. By maintaining a high aspect ratio of the shorter fibers, the overall cumulative length of the individual fibers per unit volume of material is maintained or increased. Even recycled paper, comprising a mixture of softwood and hardwood fiber, can be used in conjunction with the high viscosity, high yield stress compositions taught and disclosed herein to yield articles having improved strength and toughness. In general, fibers may economically be included in amounts from about 2% to about 80% by weight of the total solids, or about 1% to about 40% by weight of the overall mixture, including water. As a general rule, however, where fibers of low average length are used it will be necessary to include a greater volume of fibers to obtain the same or similar mechanical properties compared to the use of longer-length fibers.

To further decrease the cost and also to impart desirable properties to the final article, inorganic fillers or aggregates may be optionally added in amounts up to about 80% by weight of the total solids in the moldable mixture. To obtain mixtures having a high concentration of inorganics, the inorganic aggregate particles are selected to have a shape and particle size distribution that preferably produces a high packing density. This process is referred to as particle packing. One preferred inorganic aggregate is natural limestone (calcium carbonate). Another is natural clay.

Rheology-modifying agents, such as cellulose-based, polysaccharide-based, protein-based, and synthetic organic materials can be optionally added to control the viscosity and yield stress of the fluid fraction. However, the drawback of adding large amounts of these thickening agents in addition to, or instead of, gelated starch is at least two-fold. First, such thickening agents are generally far more expensive than gelated, unmodified starches. Second, they may compete with the gelation reaction of the ungelatinized starch-based binder component with water so that, at some point, the gelation reaction of the starch-based binder is severely impeded or inhibited, thereby preventing the starch-based binder from being the primary binding agent and undermining the purpose for which the starch-based binder was included in the first place. Previously, thickening agents were used in order to improve the colloidal stability of mixtures; their use in dispersing longer-length fibers, even if possible, was not known. Therefore, to the extent that one of ordinary skill in the art were to use a thickening agent and it coincidentally or fortuitously were to aid in the dispersion of the fibers, particularly longer-length fibers, it would certainly fall within the purview of the present invention.

Besides water, the liquid fraction may include any appropriate co-solvent. Preferred co-solvents include volatile alcohols, ketones, or other liquids that aid in the evaporative removal of water from the mixture during the molding process. Other co-solvents might include relatively non-volatile components, such as ethylene glycols, polyethylene glycols, propylene glycols, glycerol, etc., which can act to plasticize or soften the hardened starch-bound structural matrix.

The fiber-filled compositions of the present invention allow for the manufacture of articles having varying thickness, such as, e.g., a thicker bottom and thinner side walls of a cup, because of the ability to maintain significant amounts of free water within the structural matrix of the article without destroying the structural integrity of the matrix. Thus, while a thicker portion of a molded article might contain more free water than a thinner portion after a period of time within the heated mold, the entire article may be demolded at once because of the overall strength and form stability of the article due to the inclusion of substantially uniformly dispersed fibers. Of course, any variation in the water content within a newly demolded article will tend to equilibrate over time in any event. The ability to have varying wall thicknesses is also enhanced by the greatly increased fracture energy imparted by the substantially uniformly dispersed fibers throughout the matrix of the water-equilibrated article. Articles that can be manufactured using the inventive compositions and methods include, e.g., containers, utensils, cups, trays, sandwich containers, plates, cartons, boxes, bottles, crates, dividers, and numerous other articles used in, e.g., packaging, storing, shipping, serving, portioning, and dispensing almost any imaginable liquid or solid good.

Articles having the desired flexibility and toughness can be molded directly without the need for subsequent high humidity conditioning because of the ability of the newly demolded articles to retain residual water. The inclusion of uniformly dispersed fibers allows for the creation of form stable articles that can be demolded and used immediately for their intended use that include about 2% to about 6% residual moisture by weight, more preferably from about 3% to about 4% moisture by weight. It is also believed that some of the water retained by the fibers may migrate from the fibers to the hardened starch-bound matrix over time, thereby further softening the structural matrix of the article. Although further flexibility may be obtained through conventional conditioning in a high humidity chamber, wherein the articles are exposed to elevated humidity and temperature over time, this procedure is generally cost-ineffective and unnecessary.

From the foregoing, an object of the present invention is to provide compositions and methods for manufacturing novel starch-bound materials that can replace thermoplastics and other conventional materials for producing packaging materials and other articles.

Another object and feature of the invention is to provide methods for improving the dispersion of fibers within starch-bound materials without the use of large quantities of water.

Yet another object and feature is that such methods allow for the more thorough dispersion of fibers, particularly relatively long-length fibers (i.e., those having an average length greater than about 2 mm) and/or fibers of high aspect ratio (i.e., at least about 25:1) within starch-based compositions.

A further object of the present invention is to provide fiber-filled compositions and methods that yield starch-bound articles that have properties similar, or even superior, to thermoplastics and other conventional materials.

Another object and feature of the present invention is to provide compositions and methods that yield hardened starch-bound articles that do not require the addition of synthetic polymers or prolonged, high-humidity conditioning in order to obtain the required strength and toughness.

A further object is to provide compositions and methods which yield starch-bound articles which do not require the application of a coating or the inclusion of a synthetic polymer to maintain the proper moisture within the starch-based articles.

Another object and feature is to provide compositions and methods that allow for the manufacture of starch-bound articles through a gelation/retrogradation process having varying cross-sectional thicknesses throughout the same article.

Another object of the present invention is to provide compositions and methods that make possible the manufacture of articles at a cost that is comparable to, or even less than, existing methods of manufacturing containers or other articles from thermoplastics or other conventional materials.

Yet another object is that such compositions and methods yield articles having a similar cross-section and comparable mechanical properties of, e.g., strength, toughness, and flexibility, compared to thermoplastics or other conventional materials.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not, therefore, to be considered to be limiting of its scope, the invention will be described and explained with additional specificity and detail through the use of the accompanying drawings in which.

DETAILED DESCRIPTION OF THE PREFERRED EMBODIMENTS

Figure 1:
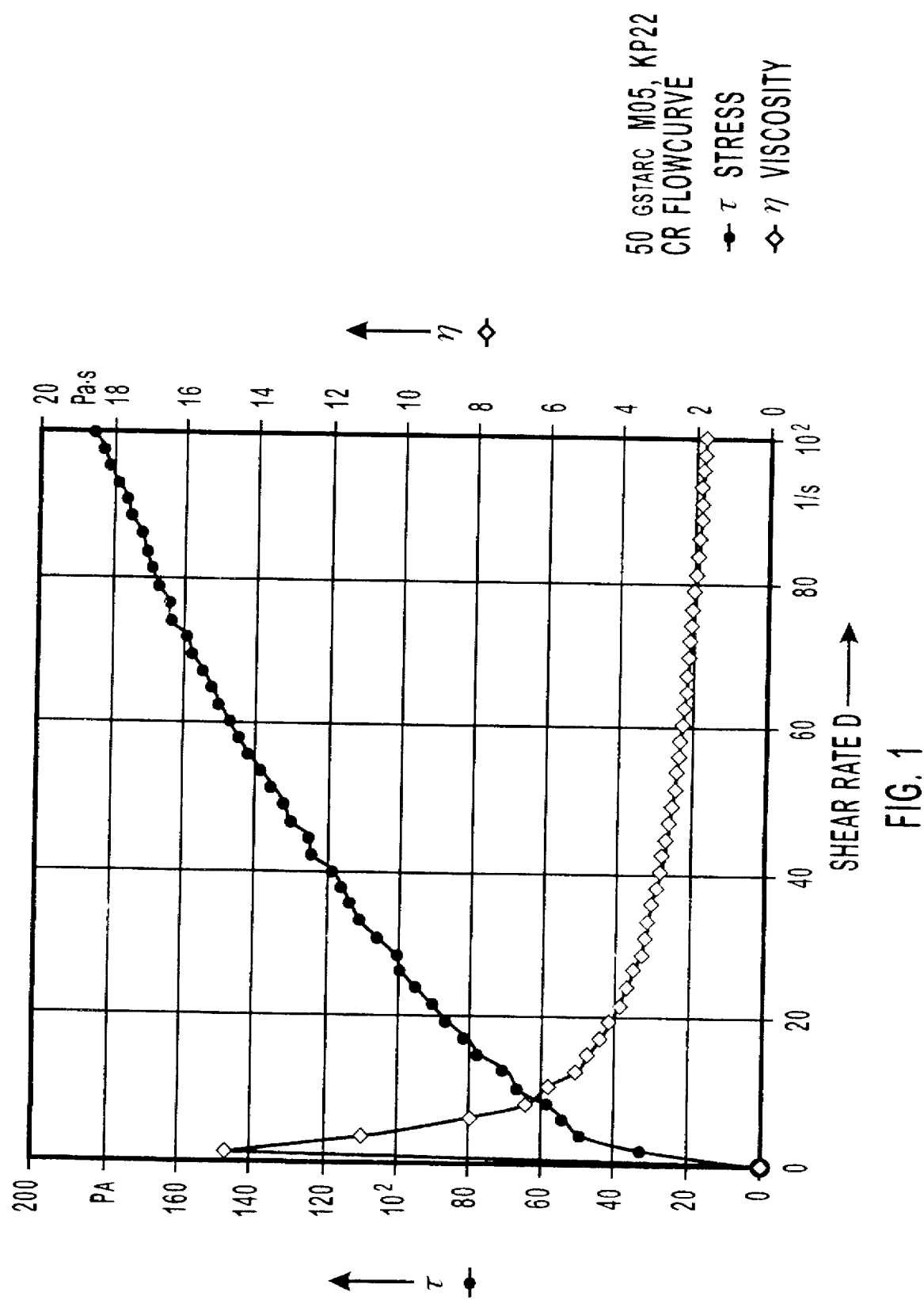
FIG. 1 shows a graph illustrating the yield stress and viscosity of a mixture containing 50 g gelated starch and 800 g water.

The present invention is directed to methods for obtaining starch-based compositions having substantially uniformly dispersed fibers used to make fiber-reinforced, starch-bound articles. The fibers are uniformly dispersed by means of a high yield stress, high viscosity fluid fraction within the overall composition and are preferably of longer-length (>2 mm) and high aspect ratio (>25:1). Articles manufactured from such compositions have greatly increased strength, ductility and toughness, as well as the ability to retain significant levels of free water within the starch-bound structural matrix. The inclusion of uniformly dispersed fibers allows for the inclusion of significant concentrations of inorganic aggregate fillers, which further permits the articles to be more quickly molded and demolded, less expensive, more environmentally safe, and more resistant to heat compared to articles made with only minimal mounts of inorganic filler. The strengthening and toughening effects imparted by the fibers obviate, or at least greatly reduce, the need for subsequent conditioning of the molded articles using high humidity or the addition of oils, plasticizers, synthetic polymers or other toughening agents.

I. DEFINITIONS

The terms "starch-based composition", "moldable composition", "fiber filled composition," or "starch-based mixture", as used in the specification and the appended claims, have interchangeable meanings and shall refer to a starch-containing composition having substantially uniformly dispersed fibers. The composition includes a fluid fraction comprising, at a minimum, water and a yield stress increasing agent, such as gelatinized starch. The composition may also include other admixtures, such as an ungelatinized starch based binder component, an inorganic filler or aggregate, mold-releasing agents, organic aggregates, dispersants, cross-linkers, rheology-modifying agents, hydraulically settable binders, plasticizers, humectants, and integral coating or sealing materials.

The terms "fibrous mixture" and "fibrous composition", as used in the specification and the appended claims, shall refer to a composition that includes, at a minimum, water, a gelatinized thickening agent, and substantially uniformly dispersed fibers. An important distinction between a "fibrous mixture" and a "starch-based composition" is that the yield stress and viscosity of the fluid fraction within the former must be high enough to result in substantially homogeneous dispersion of the fibers (i.e., the fluid fraction is an approximate Binghamian plastic), while in the latter, the yield stress and viscosity of the fluid fraction may be altered once the fibers have been dispersed in order to create a more workable and easily molded composition. The thickening agent employed in the "fibrous mixture" can also include a cellulose-based thickener or other rheology-modifying agent.

The term "fibrous slurry", as used in the specification and the appended claims, shall refer to a mixture of fibers and water to which a thickening agent has not been added, or which contains a yet ungelatinized thickening agent, such as unmodified starch. The fluid fraction of a fibrous slurry exhibits essentially Newtonian flow characteristics. A fibrous slurry becomes a fibrous mixture upon adding a gelatinized thickening agent and homogeneously dispersing the fibers throughout the resulting fluid fraction.

The terms "fluid fraction", "fluid system", or "liquid fraction", as used in the specification and the appended claims, shall refer to the fluid or liquid component within either the starch-based composition or fibrous mixture, minus the solid components that are not actually dissolved within the fluid fraction. The fluid fraction includes all components that are dissolved within the aqueous solvent, even materials that are initially solid or which will return to a solid state upon the removal of the aqueous solvent. The fluid fraction is characterized as having an approximate Binghamian flow behavior (i.e., having a measurable yield stress) as opposed to a Newtonian flow (i.e., having essentially no yield stress regardless of whether or not it has a high viscosity), at least until the fibers are substantially uniformly dispersed within the fluid fraction. After the fibers have been dispersed, it is generally permissible to add additional water and/or a dispersant in order to reduce the viscosity and yield stress of the fluid fraction.

The terms "yield stress increasing agent", "thickening agent" or "thickener", as used in the specification and the appended claims, refers to any generally water soluble or water-dispersible material, such as gelatinized starch or its equivalents, that can be used to increase the yield stress of the fluid fraction and thereby aid in the dispersion of the fibers throughout the fluid fraction. The thickening agent works by appropriately increasing the yield stress of the fluid fraction to a level in which the shear forces from the mixer can be transferred through the fluid fraction down to the fiber level. A preferred thickening agent is gelatinized starch, which, upon the removal of water from the moldable mixture, can also act as a binder.

The terms "interact" and "interact together", as used in the specification and the appended claims, shall refer to the chemical change or interaction that occurs as the yield stress increasing agent (or thickening agent) gelates or otherwise mixes with the aqueous solvent system or water to increase the yield stress and viscosity of the fluid fraction. In the case of a pregelatinized or modified starch, the thickening agent "interacts together" with and gelates in the aqueous solvent upon being dispersed within the aqueous solvent, normally without heating the mixture. In the case of an unmodified starch, the thickening agent "interacts together" with and gelates in the aqueous solvent upon being dispersed within an aqueous solvent that has been heated to at least the gelation temperature of the particular unmodified starch being used. The interaction between the thickening agent and water forms the "thickened fluid fraction" having the desired rheological properties.

The term "starch-based binder", as used in the specification and the appended claims, refers to any starch or starch derivative that can act as a binder through the gelation of the starch-based binder in water and the subsequent removal of at least a portion of the water from the starch-based gel. The term "starch-based binder" shall refer to any such binding agent without regard to the extent of gelation, removal of water, or retrogradation. Therefore, any starch or starch derivative shall fall within the broad definition of "starch-based binder," whether modified or unmodified, gelated or ungelated, dispersed in water, or hardened through the removal of part or all of the water from the starch-based gel. If gelated during the fiber dispersion step, a "starch-based binder" may also constitute a thickener.

The terms "starch-based gel," "gelated starch," or "gelatinized starch," as used herein, shall refer to an aqueous gel formed by the gelation, or gelatinization, of a starch-based binder or thickening agent in an aqueous solvent, which is akin to dissolution of the starch component. A "starch-based gel" is characterized as being able to harden upon the evaporative removal of the aqueous solvent. It does not refer to what has been referred to in the art as a "hot melt" or "destructurized starch", which generally requires the application of elevated temperatures and extremely high pressures for an extended period of time in the presence of low water, or in the presence of a flux, in order to cause the starch to become molten. Because the melted or destructurized starch can only solidify upon cooling it below the "glass transition temperature", it acts as a thermoplastic. In a hot melt, low concentrations of water are sometimes added, not to gelate the starch granules, but rather to plasticize or soften the hot melt. Nor does the hot melt solidify through the removal of such water, but rather upon lowering the temperature.

The terms "long-length" and "longer-length" fibers, as used in the specification and the appended claims, shall refer to fibers having an average length of at least about 2 mm. The term "high aspect ratio", as used in the specification and the appended claims, shall refer to fibers having an average aspect ratio of at least about 25:1. The terms "uniformly dispersed" and "homogeneously dispersed" fibers, as used in the specification and the appended claims, shall refer to a starch-based composition in which any two random samples of equal volume have substantially the same concentration and overall length of fibers dispersed therein.

As used in the specification and the appended claims, the term "total solids" includes the actual solids dispersed throughout the fluid fraction, together with all admixtures that are initially in a solid or semi-solid state before being dissolved into the fluid fraction. Hence, the term "total solids" includes any portion of, e.g., the starch-based binder or any other admixture that may, at some point, be dissolved into the fluid fraction and which only resolidifies upon the evaporative removal of the water. For purposes of determining the relative concentrations of the components within the starch-based mixture, the term "total solids" will refer to the actual solids within the overall mixture and all solids that are dissolved within the fluid fraction.

The terms "hardening," or "retrogradation", as used in the specification and the appended claims, shall refer to the process of removing enough water from a starch-based composition to cause it to harden into the shape and structure of a desired article. The term "hardening", however, is not limited by the extent of gelation or retrogradation, or the amount of water that has been removed.

The terms "mixing", "combining" and "blending", as used in the specification and the appended claims, essentially have interchangeable meanings and shall refer to any process in which two or more components are mixed together to form a mixture, without regard to whether the resulting mixture is a single phase system (e.g., a liquid) or whether it includes two or more phases (e.g., a solid and/or a gas dispersed within a liquid).

The term "form-stable", as used in the specification and the appended claims, refers to a newly demolded article that has sufficient strength and structural integrity to be removed from the mold, support its own weight against the force of gravity, and resist significant deformation when exposed to subsequent processing and handling. Furthermore, the term "form-stable" means that the article has sufficient water removed from its matrix so it will not bubble or crack as a result of vapor expression once the article is removed from the heated molds.

The terms "fiber-reinforced article", "molded article", "starch-bound article", and "article of manufacture", as used in the specification and the appended claims, are intended to include any article that can be formed using the disclosed fiber dispersion processes and compositions. Examples of such articles include containers, such as food and beverage containers and packaging containers. Articles within the scope of this invention also include such disparate objects as cutlery, lightweight cushioning materials, mailing tubes, and light fixtures.

The terms "fiber-reinforced, starch-bound matrix", "starch-bound matrix", "fiber-reinforced, starch-bound material", or "starch-bound material", as used in the specification and the appended claims, are interchangeable and shall refer to the substantially hardened structure of an article formed by removing at least part of the water from a starch-based composition.

The terms "container" or "containers", as used in the specification and the appended claims, are intended to include any receptacle or vessel utilized for, e.g., packaging, storing, shipping, serving, portioning, or dispensing various types of products or objects (including both solids and liquids), whether such use is intended for a single or a long-term use.

The phrases "mass-producible" or manufactured in a "commercial" or "economically feasible" manner, as used in the specification and the appended claims, shall refer to the capability of rapidly producing articles at a rate that makes their manufacture economically comparable, or even superior to, articles made from conventional materials, such as paper, thermoplastics, glass or metal.

II. CONCEPTUAL OVERVIEW OF THE FORMATION PROCESS

The preferred starch-based compositions of the present invention are prepared by combining selected components and blending them until a homogeneous mixture having uniformly dispersed fibers is obtained. An important step involves the preparation of a fluid fraction having high yield stress and high viscosity in order to uniformly disperse the fibers within the starch-based composition. The ability to thusly disperse longer-length fibers of high aspect ratio is a key inventive feature that greatly improves the final strength and other performance properties of articles molded from such compositions. Uniformly dispersed fibers greatly increase the strength and flexibility of the formed articles, and aid in creating a form stable and internal pressure resistant product without removing all of the water from the article during molding. The well-dispersed fibers form a fibrous internal matrix, lattice structure, or skeleton that strengthens the newly formed starch-bound structure of the newly formed articles. Although longer-length fibers are preferred, it has also been found that shorter-length fibers (i.e., those having an average length between about 0.3 mm to about 2 mm) impart improved strength properties as long as the aspect ratio and concentration are kept high, which work together to maintain a high overall fiber length within the mixture.

Before it was discovered that a high yield stress, high viscosity fluid fraction would result in better transfer of shear to disperse the fibers, compared to simply adding more water, it was particularly difficult to get a uniform dispersion of fibers throughout a starch-based mixture, especially longer-length fibers. Only a reduced amount of fiber loading was possible, and only using shorter fibers having an average length between 0–1.5 mm. Because even these shorter fibers could only be partially dispersed, such mixtures yielded articles having properties that were far inferior to articles made using the compositions and methods of the present invention. If one attempted to disperse fibers, particularly long-length fibers, within a typically low yield stress aqueous slurry, the shear forces imparted by the mixer did not transfer down to the fiber level but were dissipated within the churning aqueous phase. Simply increasing the shear rate of the mixing apparatus was ineffective and usually led to the formation of fibrous clumps or nodules.

For example, in the paper industry, wood pulp fibers are typically dispersed in an aqueous slurry having a suspension of 4% by weight of fiber and 96% by weight of water. Even if dispersion is achieved, a large amount of energy is then required in order to remove the water from such slurries, which may contain even larger amounts of water, up to about 99.5% by volume. Because so much water must be removed from paper slurries, it is necessary to literally suck water out of the slurry, even before the drying process is begun.

Such an approach as used in the paper industry would not work in trying to disperse fibers in a starch-based mixture since there would remain the expensive procedure of removing the enormous excess of water. The process of removing the water would result in large fiber nodules rather than the desired dispersion of the fibers. In contrast, the compositions and methods of the present invention use comparatively low quantities of water, together with a yield stress increasing agent or thickener, such as gelatinized starch, to disperse the fibers within the starch-based composition.

The preferred starch-based composition is prepared by mixing a fibrous material having individual fibers, preferably having an average length greater than about 2 mm and up to about 25 mm, with water to form an initial fibrous slurry. A yield stress increasing agent, such as unmodified starch, is then added to the initial mixture, whereupon the starch is gelatinized by raising the temperature of the fibrous slurry to at least the gelation temperature of the starch (between about 65° C. to about 95° C.) in order to raise the yield stress and viscosity of the fluid fraction to the desired level. In a second preferred embodiment, a pregelatinized or modified starch is added and gelatinized by simply mixing the fibrous slurry. Alternatively, other appropriate thickeners could be used to raise the yield stress and viscosity of the mixture to the desired levels. The fibrous mixture is mixed at high shear for an effective amount of time to uniformly disperse the fibers therein, with the increased viscosity and yield stress transferring the shearing energy from the mixer through the liquid fraction and down to the fiber level. The high yield stress fluid fraction is thus primarily responsible for pulling apart and dispersing the fibers within the fibrous mixture.

Once the fibers have been dispersed to the desired level within the fibrous mixture, other optional admixtures, such as additional unmodified starch and water, inorganic fillers, dispersants, humectants, integral coating or sealing materials, cross-linking agents, mold release agents, etc. may be added. If additional unmodified starch is added, and if the fibrous mixture was heated in order to gelatinize an unmodified starch thickener, the fibrous mixture should first be cooled to below the gelation temperature of the starch thickening agent, unless gelatinization of the additional unmodified starch is immediately desired. In most cases, it will be desirable to delay gelatinization of the additional unmodified starch until during the heated molding procedure because of the need to maintain adequate workability and flowability of the starch-based composition. The moldable composition can then be used to produce any article having a desired shape and a foamed structural matrix, with the article usually being form-stable within about 30 seconds to about 2 minutes after the molding process has begun (i.e., the mixture first being positioned between the dies).

The viscosity and yield stress of the starch-based composition can be controlled by varying the respective amounts of gelatinized thickener and water within the mixture. Preferably, the yield stress of the fluid fraction used to initially disperse the fibers within the fibrous mixture will be at least about 10 Pa, up to about 5000 Pa, preferably in a range from about 20 Pa to about 2000 Pa, more preferably from about 50 Pa to about 1000 Pa, and most preferably from about 100 Pa to about 500 Pa. It has been found that there is a more direct correlation between the yield stress of the fluid fraction and the ability to uniformly and homogeneously disperse the fibers within a mixture than between viscosity and fiber dispersion. In fact, even highly viscous mixtures, if they have little or no yield stress, are generally unable to adequately and uniformly disperse the fibers.

Nevertheless, although the viscosity of the fluid fraction is less important than maintaining the yield stress at an appropriate level, the fluid fraction of the fibrous mixture during the dispersion step will generally have an apparent viscosity of at least about 3 Pa.s, up to about 3000 Pa.s, preferably in a range from about 5 Pa.s to about 1000 Pa.s, more preferably from about 10 Pa.s to about 500 Pa.s, and most preferably from about 30 Pa.s to about 200 Pa.s (as measured on a Paar-Physica viscometer at a shear rate of $5\ s^{-1}$). The "plastic viscosity" of the same fibrous mixture, when determined by the best fit line on a flow curve at a shear rate between $60\ s^{-1}$ to $100\ s^{-1}$, will fall generally within a broad range from at least about 0.1 Pa.s, up to about 100 Pa.s, preferably in a range from about 0.25 Pa.s to about 100 Pa.s, more preferably from about 0.4 Pa.s to about 50 Pa.s, and most preferably from about 0.5 Pa.s to about 20 Pa.s.

To understand the importance of having a high yield stress liquid phase within the fibrous mixture, it must be understood that adding solid components to an otherwise Newtonian fluid can often increase both the viscosity and yield stress of the overall mixture. However, it is the liquid phase that has been found to be the medium by which shear is transferred from the mixing apparatus down to the fiber level. If the liquid phase has essentially a zero or very low yield stress, even though the overall mixture has a positive yield stress, the fibers will easily separate or segregate from the noncohesive liquid phase. Only a liquid phase that has sufficient yield stress and viscosity and, hence, adhesion and cohesion, is able to pull apart and keep the fibers separated during the mixing process.

The fibrous mixture is mixed at high shear for at least about 10 minutes and up to about 2 hours, and preferably from about 10 to 30 minutes, in order to thoroughly disperse the fibers. The length of the mixing time of the fibrous mixture depends on the viscosity and yield stress of the fluid fraction and the concentration of fibers therein, with more fibers generally requiring a longer mixing time.

The optional cool-down procedure in the case where the fibrous mixture is heated to gelatinize an unmodified starch thickener may be performed by simply adding additional water and other components to the mixture prior to adding additional ungelatinized starch-based binder. The other components, such as the inorganic fillers, mold releasing agents, humectants, plasticizers, and integral coatings or sealing compounds, are added at this time to form the final starch-based composition. The composition is then mixed for a few minutes until homogeneous in order to form the desired moldable composition.

In the case where additional solids are included, they will tend to increase both the yield stress and viscosity of the final moldable starch-based composition, which will typically have a yield stress of at least about 10 Pa, up to about 10,000 Pa, preferably in a range from about 250 Pa to about 4000 Pa, more preferably from about 500 Pa to about 3000 Pa, and most preferably from about 1000 Pa to about 2000 Pa. The associated apparent viscosity of the final mixture measured at $5\ s^{-1}$ will generally fall within a broad range from at least about 6 Pa.s, up to about 3000 Pa.s, preferably in a range from about 50 Pa.s to about 2000 Pa.s, more preferably from about 100 Pa.s to about 1000 Pa.s, and most preferably from about 300 Pa.s to about 600 Pa.s. The plastic viscosity of the same starch-based composition, when determined by the best fit line on a flow curve at a shear rate between $4\ s^{-1}$ to $14\ s^{-1}$, will generally fall within a broad range from at least about 1 Pa.s, up to about 2000 Pa.s, preferably in a range from about 2 Pa.s to about 500 Pa.s, more preferably from about 4 Pa.s to about 100 Pa.s, and most preferably from about 10 Pa.s to about 30 Pa.s.

In mixing together the components of the moldable composition, it is preferable that the addition of unmodified starch binder not be subjected to shearing forces large enough to break or rupture the starch granules. It is also preferable to maintain the mixture at a temperature below the gelation temperature of the starch-based binder to avoid premature gelation of the binder before the molding process has begun. Otherwise, the viscosity of the moldable composition can become too high and become unworkable. The moldable composition needs to remain sufficiently fluid to be pumped to and flow into a mold to form a desired article. Pregelatinizing a substantial portion of the total starch-based binder prior to molding would yield a very rigid gel that would prevent the moldable composition from flowing into a mold. By allowing only a portion of the starch-based binder to gelate in order to disperse the fibers, the moldable composition maintains a suitable workability. Once heated within the mold, however, the ungelated starch-based binder will quickly gelate in order to greatly increase the viscosity and yield stress of the moldable composition, thereby helping to create a form stable molded article that can be more easily demolded.

The key to getting the fibers to disperse in the fibrous mixture is to obtain a transfer of the shearing force from the mixer to the liquid in contact with the fibrous material. The shearing force is an internal force tangential to the material on which the force acts. When fibers are mixed with low viscosity, high water mixtures, the fibers are not dispersed since the requisite shearing force from the mixer is dissipated into the water and does not transfer to the fibers. Since the water has a lower viscosity, the water has a tendency to segregate from the fibers and not provide any shear thereto. Thus, improving the transfer of shear from the mixer to the liquid in contact with the fibrous material is necessary in order to disperse the fibers.

The mechanism for obtaining this transfer of shear is by means of a fluid fraction having an approximate Binghamian flow behavior, which transfers shear properties from the mixer down to the fibrous material, which generally results in the dispersion of the fibers within about 10 to 30 minutes. The higher yield stress and viscosity of the fluid fraction allows a much greater transfer of the shearing force from the mixer to the liquid in contact with the fibrous material. This results in the application of the shearing force to the connections between the fibers in the fibrous material, which causes the fiber nodules to be torn apart and dispersed. The level of transfer of shear by means of the high yield stress, high viscosity fluid fraction within the fibrous mixtures of the present invention results in a markedly improved dispersion of fibers, compared to conventional methods.

In addition to gelating a portion of the starch-based binder to act as the thickening agent to disperse the fibers, various rheology-modifying or thickening agents can be used to increase the yield stress of the fluid fraction, such as the commercial thickener Tylose®. It has been found, however, that Tylose® has a very high affinity toward water, which interferes with the starch-water reaction. Hence, adding relative large quantities of rheologymodifying agents such as Tylose® is generally not preferred.

The addition of long fibers to the moldable mixture, which are dispersed throughout the mixture by the methods of the present invention, allows a product to be molded without the need for a subsequent conditioning step. Unlike prior processes, the products of the present invention can be demolded before all of the water has been removed from the mixture. The final demolded product maintains an appropriate amount of water so that the product is not brittle and can be handled without shattering or cracking.

Once the starch-based composition has been prepared, it may be formed or molded into the shape of the desired article. In one embodiment, the forming steps include positioning and locking the composition between a heated male mold having a desired shape and a heated female mold having a complementary shape. The heat from the molds causes the composition to expand within the molds. Excess material and vapor is expelled from between the molds through small vent holes. Once a sufficient amount of the solvent has been removed, the molds are opened, and the form-stable article having a foamed structural matrix is removed for subsequent processing. In general, the molded articles will contain about 2–6% moisture at the point where the article has adequate strength and form stability to be demolded. Solid, unfoamed articles may also be manufactured by altering the molding conditions, usually by decreasing the amount of water in the starch-based composition, decreasing the space in which the mixture would otherwise expand, and evaporating the water more slowly.

III. DETAILED OVERVIEW OF COMPONENTS.

As set forth above, the fibrous mixtures made according to the present invention must include, at a minimum, a yield stress increasing agent (thickener), an aqueous solvent system, and substantially uniformly dispersed fibers. Once the fibers have been uniformly dispersed throughout the fluid fraction, other admixtures may be added to the fibrous mixture in order to form the final starch-based composition. These include, but are not limited to, additional ungelatinized starch-based binders and water, inorganic aggregate fillers, mold release agents, dispersants, integral coating and sealing materials, humectants, plasticizers, cross-linking agents, and other appropriate admixtures.

A. Yield Stress Increasing Agents/Thickeners.

The thickener, or yield stress increasing agent, may be any organic material that is able to gelate in water or otherwise raise the yield stress and viscosity of the fluid fraction to the appropriate levels. The thickener is preferably an unmodified starch that is gelatinized in situ by raising the temperature to at least the gelation temperature of the particular unmodified starch being used. Alternatively, it may be a pregelatinized starch or any of a myriad of other thickeners known in the art, as set forth hereinbelow.

1. Starch-based Thickeners/Binders.

The preferred yield stress increasing agent usually comprises a starch-based material, because it will be most compatible with any unmodified starches that are included within the moldable starch-based composition to act as a binder upon molding the composition between heated molds. Upon heating the starch-based composition to above the boiling point of water, the unmodified starch-based binder will gelate and then harden upon the removal of water from the mixture by evaporation.

Starch is a natural carbohydrate chain comprising polymerized sugar molecules (glucose). Plants manufacture and store the starch as food for itself and for seeds. Starch is formed in granules that comprise two types of glucose polymers: the single-chain amylose that is generally soluble in water and other solvents and the branched amylopectin that is generally insoluble in water. In general, starch granules are insoluble in cold water; however, if the outer membrane has been broken by, e.g., grinding, the granules can swell in cold water to form a gel. In hot water, the granules quickly swell and then burst, resulting in gelation of the starch with the surrounding water. The exact temperature at which a starch granule swells and gelates depends on the type of starch being used.

Gelation results from the binding of water molecules within the tangled mass of amylose and amylopectin chains through hydrogen bonding. Upon removal of the water by evaporation, the resulting mesh of inter-connected polymer chains forms a solid material that can have a tensile strength up to about 40–50 MPa. The gelated starch may also be referred to as a "starch-based binder" in light of its ability to bind together solid components, such as fibers or inorganic aggregate fillers, upon the evaporative removal of water.

Although starch is produced in many plants, the most important sources are seeds of cereal grains, such as corn, waxy corn, wheat, sorghum, rice, and waxy rice, tubers, such as potatoes, roots such as tapioca (i.e., cassava and manioc), sweet potato, and arrowroot, and the pith of the sago palm. If in a native state, such starches are known as "unmodified" starch. If gelated in water, they are "gelated" or "gelatinized" starch. If gelated and then dried to form a powder, they are "pregelated" or "pregelatinized" starch. If chemically altered by, e.g., etherification, esterification, oxidation, acid hydrolysis, amination, enzyme conversion, cross-linking, polymerization, etc., they are known as "modified" starches.

Typical modified starches include esters, such as the acetate and the half-esters of dicarboxylic acids/anhydrides, particularly the alkenylsuccinic acids/anhydrides; ethers, such as the hydroxyethyl and hydroxypropyl starches; oxidized starches, such as those oxidized with hypochlorite; starches reacted with cross-linking agents, such as phosphorus oxychloride, epichlorohydrin, hydrophobic cationic epoxides, and phosphate derivatives prepared by reaction with sodium or potassium orthophosphate or tripolyphosphate, and combinations thereof. Modified starches also include seagel, long-chain alkylstarches, dextrins, amine starches, and dialdehyde starches.

Since pregelatinized and many modified starches gelate in cold water, such starches can be added to the fibrous mixture to increase the viscosity and yield stress without heating. However, unmodified starches are generally preferred due to their lower cost and because they yield comparable articles.

One preferred starch is potato starch, which quickly gelates and reaches a maximum viscosity and yield stress at about 65° C., which then decrease somewhat as the mixture is heated further. Waxy corn starch acts in a similar fashion and is also preferred. Both potato starch and waxy corn starch yield a high viscosity, high yield stress fluid fraction when gelated. They are also preferred because they swell and gelate easily in a single step; however, any starch that has similar swelling characteristics will be preferred to those that swell in two or more stages.

In many conventional uses of starch, such as the hot-melt technique in which the starch is heated under elevated temperature and extreme pressure in the presence of minimal water, and in which starch behaves somewhat like a thermoplastic material (also sometimes referred to as "destructurized" starch), it has been necessary to use a starch having a relatively high amylose content (greater than 45% by weight) in order to make the starch more chemically compatible with the small amount of water that might be added to plasticize the starch material. This is in sharp contrast to the way in which starch-based binders are used in the present invention, in which the contribution by the starch-based binder to the mechanical properties of the final molded article is independent of the amylose content. In fact, the two most preferred starch-based binders, namely unmodified waxy corn starch and potato starch, have a relatively low amylose content (1–3% and 20–25%, respectively). In view of the foregoing, while any appropriate starch-based binder can be used to form an adequate product, the starch-based binder will preferably be an unmodified starch having an amylose content less than about 45%, more preferably less than about 35%, and most preferably less than about 25%.

In order to create a fluid fraction within the fibrous mixture having the desired yield stress and viscosity, the gelatinized starch will preferably have a concentration in a range from about 5% to about 40% by weight of the fluid fraction, more preferably in a range from about 8% to about 25% by weight of the fluid fraction, and most preferably in a range from about 10% to about 15% by weight of the fluid fraction. Upon the addition of other admixtures to the fibrous mixture, including additional unmodified starch-based binder or water, the concentration of starch as a weight percentage of the fluid fraction may deviate from these ranges.

As the starch-based composition is heated to above the gelation temperature of the ungelatinized starch-based binder within the starch-based composition, both the gelatinized starch within the fluid fraction and the unmodified starch component become essentially interrelated and will both contribute binding strength to the overall hardened composition within the molded article.

2. Other Thickeners.

Thickeners other than gelatinized starches can be added to form the appropriate fluid fraction within the fibrous mixture to effect fiber dispersion. However, if appreciable amounts of an ungelatinized starch-based binder are added to the fibrous mixture to form the desired starch-based composition, it is generally preferred not to include so much of a nonstarch thickener so as to interfere with the desired gelation reaction of the unmodified starch-based binder and water during subsequent molding. In many cases, the other thickener may be added in combination with a gelatinized starch-based thickener in order to assist in raising the yield stress and viscosity to the desired levels. However, if an ungelatinized starch binder is not added to the mixture, or if the thickener is compatible with the ungelatinized starch binder, it would appear that a thickening agent other than a starch-based thickener could be used.

A variety of natural and synthetic organic thickening agents may be used which have a wide range of properties, including yield stress, viscosity, and solubility in water. A particularly suitable rheology-modifying agent that can be used in conjunction with, or even in place of, the starch thickener, includes cellulose-based materials, which are chemically similar to starches in that they comprise polymerized glucose molecules. Cellulose-based thickeners comprise a wide variety of cellulosic ethers, such as methylhydroxyethylcellulose, hydroxymethylethylcellulose, carboxymethylcellulose, methylcellulose, ethylcellulose, hydroxyethylcellulose, hydroxyethylpropylcellulose, hydroxypropylmethylcellulose, etc. The entire range of possible permutations is enormous and shall not be listed here, but other cellulose materials which have the same or similar properties would also work well.

Other natural polysaccharide-based thickening agents include, for example, alginic acid, phycocolloids, agar, gum arabic, guar gum, locust bean gum, gum karaya, xanthan gum, and gum tragacanth. Suitable protein-based thickening agents include, for example, Zein® (a prolamine derived from corn), collagen (derivatives extracted from animal connective tissue such as gelatin and glue), and casein (derived from cow's milk).

Finally, suitable synthetic organic thickening agents include, for example, polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylamides, ethylene oxide polymers, polylactic acid, and latex (which is a broad category that includes a variety of polymerizable substances formed in a water emulsion; an example is styrene-butadiene copolymer).

Because of the wide variety of thickening agents that may be employed to assist, or perhaps even take the place of, the starch-based thickener, preferred concentration ranges shall not be given here. As a general rule, however, the preferred amount of thickening agent (or thickening agent plus starch-based thickener) within the fibrous mixture will be similar to the preferred concentration ranges for the starch-based thickener standing alone. Upon the removal of water from the starch-based composition, many of the other thickeners can also impart moderate to substantial binding within the structural matrix of the final hardened article.

B. Aqueous Solvent System.

The aqueous solvent system is an important component of the fluid fraction used to uniformly disperse the fibers and includes primarily water, but may optionally include co-solvents, dispersants, and other soluble admixtures to regulate the properties of the fluid fraction or overall starch-based composition. Principally, the water acts as a gelation agent for the starch-based thickener/binder or other thickening agent that may be included within the fluid fraction. The water and other co-solvents also act as a plasticizing agent to control the rheology of the fibrous mixture and starch-based composition. In general, the aqueous solvent system is removable by evaporation in order to form the hardened starch-bound composition. In addition, non-evaporative liquids, such as lubricants, cross-linking agents, integral coatings, or internal sealing materials may also be added.

In the preferred method for molding the articles of the present invention, the water and other volatile solvents within the fluid fraction are substantially removed by heating the starch-based composition between heated dies to above the boiling point of water. Because water has a relatively high heat of vaporization compared to most other volatile solvents, the heat of vaporization of the aqueous phase within the starch-based composition can be reduced by adding lower boiling alcohols or other co-solvents to the water. Alcohols, such as ethanol and isopropyl alcohol, are preferable because they form lower boiling point azeotropic mixtures with water, are relatively inexpensive, and readily available.

The amount of water and other admixtures within the aqueous solvent system are adjusted to yield a fluid fraction and overall mixture having the desired yield stress and viscosity. During the dispersion process, the amount of water and other admixtures are adjusted so that the yield stress of the fluid fraction results in homogeneous dispersion of fibers within the fluid fraction. Once the fibers have been uniformly dispersed, however, the amount of water and other admixtures may be altered in order to obtain a composition having the desired rheology for its intended use, typically molding between heated dies.

The rheology of the final mixture should be such that the solid components remain dispersed throughout the fluid fraction and do not settle or become agglomerated. Very low viscosity mixtures can result in settling of the components, most notably the ungelated starch-based binder, fibers, and aggregate particles. Settling may occur in the mixing stage, transfer stage, or forming stage. Settling can yield articles having varying properties from batch to batch or within the structural matrix of a single article.

C. Fibers.

As used in the specification and the appended claims, the terms "fibers" and "fibrous materials" include both inorganic fibers and organic fibers. In general, any fiber that will improve the strength, flexibility, toughness, or other desired property of the molded composition can be used in the compositions of the present invention. Although fibers of any strength and aspect ratio can be dispersed using the compositions and methods disclosed herein, the present invention overcomes the problem of obtaining uniform dispersion of longer fibers (>2 mm). Hence, to the extent that fiber length is important, longer fibers may be said to be "preferred". In addition, because fibers of high aspect ratio have typically been more difficult to disperse in the past, to the extent that aspect ratio is important, fibers of high aspect ratio (>25:1) may be said to be "preferred".

Useful fibers that can be dispersed within starch-based compositions according to the present invention include naturally occurring organic fibers, such as cellulosic fibers extracted from hemp, cotton, plant leaves, sisal, abaca, bagasse, wood (both hardwood or softwood, examples of which include southern hardwood and southern pine, respectively), or stems, husks, shells, and fruits, or inorganic fibers made from glass, graphite, silica, cemmic, or metals. Recycled paper fibers can be used, but they are somewhat less desirable because of the disruption of the fiber strength and integrity that usually occurs during conventional paper manufacturing processes.

The compositions and methods allow for the homogeneous dispersion of fibers having an average length up to about 25 mm and more, although at some point the benefit imparted by lengthier fibers might be outweighed by the difficulty of obtaining good dispersion of such fibers. Similarly, fibers having an average aspect ratio up to about 2500:1 or more can be dispersed using the inventive compositions and methods, although at some point further increase in the aspect ratio might be inefficient.

Adding uniformly dispersed fibers to starch-based compositions has been shown to impart a number of interrelated benefits, including greatly improved form stability of a newly molded article so that it may be demolded and handled immediately thereafter without the need for time consuming and expensive conditioning procedures. In addition, uniformly dispersed fibers greatly increase the tensile and flexural strength, toughness, fracture energy, and flexibility of a hardened starch-bound article. Because of the greatly increased strength and toughness of the newly demolded article as a result of the inclusion of uniformly dispersed fibers, it is possible to demold the starch-bound article while maintaining from about 2–6% (perhaps more) water within the starch-bound matrix without destruction of the article. Conversely, the fibers allow for the demolding of hardened articles having virtually no water without the need for immediate conditioning before the article can be handled. As a result, such articles can simply be allowed to "self-condition" under ambient conditions.

The fibers also allow a greater window of time in which the article may be demolded without causing damaging effects, such as cracking of the material. Even if all of the water is taken out of the mixture by overheating, the fibers will prevent cracking of the formed structural matrix because they reinforce the entire matrix and prevent the article from shrinking. The moldable mixture can also be somewhat underheated without damage to the product. Underheating leaves more vaporized free water within the molded composition, which would normally lead to expansion and rupture of the structural matrix but for the internal strengthening effect provided by the fibers. Thus, fibers can also aid in retaining an appropriate amount of water within the article so that the article has increased toughness and flexibility. This, in turn, allows the product to be handled straight out of the mold with little or no damage.

The variation of water that may be left within the hardened starch-bound composition as a result of the uniformly dispersed fibers also facilitates the manufacture of starch-based articles having greatly varying cross-section or wall thickness. In the past, such articles were difficult to mold because of the inability to obtain form stability of the thicker portions where it takes longer to remove the water, while not overdrying, cracking or burning the thinner portions where the water is removed much more quickly. However, the inclusion of uniformly dispersed fibers allows for the inclusion of varying amounts of water within the various sections of the molded article while maintaining fairly uniform strength throughout the article. Moreover, the extra water within the thicker portion will equilibrate into the drier thin portion within a relatively short period of time after the article is demolded (i.e., about one hour or less).

In addition, the fibers allow for large variations in the amount of water that can be added initially in order to change the density of the final product, whereas pure starch materials do not have this ability. Because the aqueous solvent can act as a foaming agent, the more water that is added to the starch-based composition initially, the larger the volume of the pores that will be created upon removing the water by evaporation. If less water is used, the lower the volume of the pores that will be created and the final product will be more dense. Thus, the density of the final product can be changed just by varying the amount of aqueous solvent within the starch-based composition. The fibers increase the working range of the water in the moldable mixture because they greatly increase the form stability and resistance to internal pressure.

The amount of fibers added to the moldable mixture will vary, depending upon the desired properties of the final product. The flexural strength, toughness, flexibility, and cost are the principle criteria for determining the amount of fiber to be added in any mix design. The concentration of fibers can range anywhere from as low as about 1% to as high as about 80% by weight of the starch-based composition. Because the starch-based composition can include other admixtures besides those added initially to form the fibrous mixture, the concentration of fibers within the fibrous mixture will tend to be somewhat higher than in the starch-based composition.

It is known that certain fibers are able to chemically interact with and bind with certain starches, thereby adding another dimension to the materials of the present invention. For example, it is known that many fibers are anionic in nature and have a negative charge. Therefore, in order to maximize the interaction between the starch-based binder and the anionic fibers and inorganic materials, it may be advantageous to add a positively charged organic binder, such as a cationic starch. In addition, the fibers may be coated with a variety of substances in order to improve the desired properties of the final product. For example, the fibers may be coated in order to make them more resistant to water absorption. Better water resistance can be obtained by treating the fibers with rosin and alum ($Al_2(SO_4)_3$) or $NaAl(SO_4)_2$, the latter of which precipitates out the rosin onto the fiber surface, making it highly hydrophobic. The aluminum floc that is formed by the alum creates an anionic adsorption site on the fiber surface for a positively charged organic binder, such as a cationic starch. In addition, cltringite can be formed on the surface of the fibers in order to improve the interaction or interface between the fibers and the starch-based binder. Finally, fibers having latex precipitated onto the surface give a more flexible interface between the fibers and the starch-bound matrix.

D. Optional Admixtures.

Although the present invention is mainly involved with compositions and methods for obtaining substantially uniform dispersion of fibers within starch-based compositions, the strengthening effect and versatility that is added to starch-based compositions might be better illustrated by identifying other admixtures that might be added to the starch-based compositions. In some cases, such as the addition of inorganic fillers, the uniformly dispersed fibers greatly increases the amount of loading of such fillers while maintaining the strength of the hardened articles formed thereby. This underscores the utility of adding homogeneously dispersed fibers according to the present invention.

1. Natural Mineral and Other Fillers.

In many cases certain desired properties of the molded starch-bound composition may be improved by the addition of natural mineral fillers. The terms "aggregate" and "fillers", as used in the specification and the appended claims, typically refer to natural or treated mineral fillers. The difference between a filler and a fiber is often related to the aspect ratio of the substance in question. If the aspect ratio of a "fiber" is less than, e.g., 5:1, then the "fiber" is more like a rectangular aggregate and might be better classified as a filler or aggregate instead. Moreover, agglomerated fibers or natural fibrous particles might also be better classified as fillers, since they are not anchored over a large distance relative to their width.

The term "inert organic particles" is further defined to include organic components that are not intended to primarily chemically or mechanically act as a binding agent within the starch-based composition. Examples of inert organic particles include seeds, grains, cork, and plastic spheres. Although most aggregates within the scope of the present invention are insoluble in water, some aggregates are slightly soluble in water, and some aggregates can be formed in situ by precipitation or polymerization. Many seeds contain starch, proteins, or other polymeric materials in high enough quantities that they may be released into the moldable mixture and impart a binding force within the mixture.

Although inorganic fillers are generally optional, articles with a high filler or aggregate content are generally cheaper to produce, have increased compressive strength, are more stable when microwaved, have lower specific heat, and have a smaller environmental impact. Studies have found that functional articles of the present invention can be made using no fillers at all or up to about 80% by weight of the final article. From a materials cost standpoint, it is more economical to replace the relatively expensive starch-based binder with a less expensive aggregate. Adding an inorganic filler also improves the ability to remove water from the starch-based mixture.

Fillers can also be added to yield articles having a desired surface finish. For example, plate-like aggregates having flat surfaces, such as mica, talc, and kaolin, can be used in order to create articles having a smoother surface finish. Typically, larger aggregates such as calcium carbonate give a matte surface, while smaller particles give a glassy surface.

Particle packing is a preferred process that can be used to maximize the amount of inorganics where a large percentage are included within the composition. Particle packing is the process of selecting different sizes, shapes, and concentration of the aggregates to minimize the interstitial space between the particles and maximize the packing density. By minimizing the interstitial space, less water and starch-based binder is required to fill up the interstitial space and, hence, the overall composition. Decreasing the specific surface area of the aggregates also decreases the amount of starch-based binder and water that must be included to adequately mold and then bind the components of the mixture.

Examples of useful aggregates or fillers include those that are commonly used in the paper industry, as well as more finely ground aggregate materials used in the concrete industry. However, the size of the aggregate or inorganic filler particles will generally be many times greater than the particles of the inorganic filler materials typically used in the paper industry, thereby greatly reducing their cost.

Examples of useful aggregates include perlite, vermiculite, sand, gravel, rock, limestone, sandstone, glass beads, aerogel, xerogels, seagel, mica, clay, synthetic clay, alumina, silica, fly ash, fused silica, tabular alumina, kaolin, microspheres, hollow glass spheres, glass beads, porous cermic spheres, gypsum (dihydrate or hemihydrate), tabular alumina, calcium carbonate, calcium aluminate, perlite, vermiculite, lightweight polymers, xonotlite (a crystalline calcium silicate gel), pumice, exfoliated rock, lightweight expanded clays, sand, gravel, rock, limestone, sandstone, and other geologic materials, hydrated or unhydrated hydraulic cement particles, cork, seeds, etc.

Another class of aggregates that may be added to the inorganically filled mixture includes gels and microgels, such as silica gel, calcium silicate gel, aluminum silicate gel, and the like. These can be added in solid form, as any ordinary aggregate material might, or they may be precipitated in situ. Because they tend to absorb waters, they can be added to reduce the water content (which will increase the viscosity and yield stress) of the moldable mixture.

The inorganic aggregates may be included in an amount in a range from about 0% to about 80% by weight of the total solids within the starch-based composition, with the preferred amount depending on the desired properties of the moldable mixture or final molded article.

2. Mold Release Agents.

To assist in demolding the newly formed articles, a "mold-releasing agent" or "mold release agent" can be added to the starch-based composition, such as medium- and longchain fatty acids, their salts, and their acid derivatives. Preferred mold-releasing agents for use in the present invention include stearates, which have hydrophobic properties and are not soluble in water. Stearates are salts of stearic acid and have the general formula of $CH_3(CH_2)_{16}COO^- X^+$, where $X^+$ can be an ion of Al, Mg, Na, K, or Ca. Stearates have specific melting points that vary depending on what salt is used. Magnesium stearate is one preferred mold release agent that has been approved by the FDA. Another is aluminum stearate, which has a lower melting point of 110° C. and gives a smoother surface finish to a formed article. On the other hand, zinc stearate is a health hazard and should be avoided, especially when forming food or beverage containers. Generally, a lower melting point or increased amount of stearate will yield articles having a smoother surface.

Other mold release agents include silicones, lecithin (which is a mixture of phosphatides and glycerides), waxes (such as paraffin and beeswax), Teflon®-based materials, calcium silicate and CaS. Wax can also act as an integral coating material, as discussed later. The molds themselves can be polished, chrome plated, or coated with, e.g., nickel, Teflon®, or any other material that limits the tendency of the articles to stick to the molds.

The above mold-releasing agents are preferably added to the mixture in a range from about 0.05% to about 15% by weight of the total solids, more preferably in a range from about 0.1% to about 10% by weight, and most preferably in a range from about 0.5% to about 1% by weight.

3. Dispersants.

The term "dispersant", as used in the specification and the appended claims, refers to the class of materials which can be added to reduce the viscosity and yield stress of the starch-based composition. They are preferably added, if at all, after the fibers have been uniformly dispersed. Dispersants create a negative charge on or around the surfaces of the aggregate particles, thereby causing them to repel each other. This repulsion of the particles adds "lubrication" by reducing the friction or attractive forces that would otherwise cause the particles to have greater interaction. This decreases the amount of water that must be added to lower the viscosity of the mixture. Dispersants can therefore be used to create low viscosity, workable mixtures that flow more easily into the mold without the addition of significant quantities of additional water. Hence, such mixtures may be suited for, e.g., the production of higher density articles (since water can act as a foaming agent). Dispersants can also improve the surface qualities of molded articles.

4. Other Admixtures.

A variety of other components can be added to the moldable mixture to impart desired properties to the mixture and final article. For example, enzymes such as carbohydrase, amylase, and oxidase produce holes in the surface of starch granules, thereby permitting unmodified starch-based binders to gelate faster.

Humectants, such as $MgCl_2$, $CaCl_2$, NaCl, or calcium citrate, can be added to help retain water within the molded starch-based composition, which can improve toughness and flexibility. Flexibility can also be obtained by adding softeners or plasticizers to the moldable mixture, such as Polysorbate 60, SMG, mono and diglycerides, distilled monoglycerides, polyethylene glycol, glycerin, and sorbitol. Since the plasticizers do not vaporize during the forming process, they remain within the form-stable article, thereby softening the starch-bound matrix.

Integral coating materials that generally have a melting point above the boiling point of super heated water within the molded article, but below the maximum temperature achieved at or near the surface of the molded article while in the mold can be used. These include waxes, polylactic acid, shellac, or other polymers. In addition, internal sealing materials such as polyvinyl alcohol and latexes can be added to generally make the cellular matrix more waterresistant. Finally, cross-linking admixtures such as dialdehydes, methylureas, and melamine formaldehyde resins can be added to the mixture to produce a less water soluble starch-based binder.

IV. Methods and Apparatus For Dispersing Fibers.

The preferred method for uniformly dispersing fibers throughout a starch-based composition may involve any number of different procedures and processing sequences so long as it employs a high yield stress, high viscosity fluid fraction to transfer shear from the mechanical mixing apparatus down to the fiber level. This is achieved by gelatinizing starch or a starch derivative in an aqueous solvent, either alone or in combination with another thickening agent. The fibers and other solid components may be added at any time, before, during or after the interaction of the thickening agent and water to form the high yield stress, high viscosity fluid fraction. The only limitation is that the fluid fraction have the appropriate rheology during the fiber dispersion process.

Once the fibers have been dispersed within the starch-based composition to the desired level, the rheology of the fluid fraction becomes less important.

In a first preferred method for dispersing fibers, the fibers and water, or a portion thereof, are placed in a mixing vessel. Some premixing might be employed to break up the larger fibrous nodules, although high shear mixing at this stage could actually cause the fibers to agglomerate and form nodules. Whatever the extent of mixing, the mixture of fibers and water may be said to comprise a "fibrous slurry". Other solids, including ungelatinized starch granules and solid fillers, may be added to the fibrous slurry, and so long as the yield stress and viscosity of the fluid fraction are not raised to the appropriate levels to obtain fiber dispersion, the mixture remains within the definition of a "fibrous slurry".

To the fibrous slurry is added a thickening agent to raise the viscosity and yield stress of the fluid fraction to the appropriate levels. If a pregelatinized or unmodified starch thickening agent is used, gelation and, hence, interaction between the thickening agent and water, occurs as the thickening agent is mixed into the aqueous phase of the fibrous slurry. If an unmodified starch is used, it will be generally necessary to raise the temperature of the fibrous slurry to above the gelation temperature of the particular unmodified starch being employed (usually in a range from about 60° C. to about 100° C.). This may be performed before, during or after the addition of the unmodified starch so long as it results in gelation of the starch-based thickening agent. In addition to, or in place of, the starch-based thickening agent, any of the aforementioned thickeners, or any equivalent thereto, may be used.

As the yield stress and viscosity of the fluid fraction are raised to the appropriate levels, the fibers are then dispersed by simply mixing the resulting thickened starch-based composition. Because of the generally thicker rheology of the fluid fraction, more force must be exerted on the mixing apparatus to simply maintain the same mixing speed, and thus more energy is imparted to the composition. However, it is not necessary to employ what has traditionally been referred to as "high shear mixing" in light of the greatly enhanced ability of the thickened fluid fraction to pull apart and disperse the fibers. For example, relatively low shear kneader-mixers may be employed, so long as the energy transferred from the mixer through the fluid fraction is great enough to obtain the desired level of fiber dispersion.

In an alternative embodiment, the water and thickening agent are interacted together to form the thickened fluid fraction, after which the fibers are added, either alone or in combination with any other solid component. The resulting mixture is appropriately mixed to obtain the desired level of fiber dispersion. If the thickened fluid fraction was formed by heating an unmodified starch, it will generally be preferable to cool the mixture before adding any additional unmodified starch that is intended to gelate only upon molding the starch-based composition using, e.g., heated dies.

The starch-based compositions having well-dispersed fibers made according to the present invention can be prepared in either batch cycles or on a continuous basis. Suitable mixing apparatus that may be used to prepare batches of a desired fiber-filled composition include, but are not limited to, the following mixers: Eirich, Hobart, Hochmeyer and Marion. Suitable mixing apparatus that may be used to prepare a desired fiber-filled composition on a continuous basis include, but are not limited to, the following mixers: Teledyne and Oakes. Nevertheless, any mixing apparatus known to those of ordinary skill in the art that would adequately disperse fibers throughout a thickened fluid fraction using the compositions and methods of the present invention are within the scope of the present invention.

Depending on the mixing apparatus, the yield stress and viscosity of the fluid fraction, and the concentration of fibers being dispersed, the time required to substantially disperse the fibers throughout the starch-based composition can vary. In general, however, the shortest mixing time that will provide adequate mixing is about 2 minutes, with about 5–30 minutes being the typical mixing time, and about 2 hours being the maximum time needed to obtain substantially uniform dispersion of the fibers in most cases.

V. EXAMPLES OF THE PREFERRED EMBODIMENTS.

Below are a number of examples showing preferred compositions and methods for obtaining fibrous mixtures having substantially uniformly dispersed fibers. In the first set of examples, starch-based compositions were prepared that were thereafter molded into articles, such as cups and sandwich containers. In later examples, different fibrous mixtures were formed without regard to intended use, to which may be added any appropriate admixture, such as those that are suggested above, in order to prepare a desired moldable starch-based composition used to mold a desired article therefrom. Finally, a comparative study showing the utility of including uniformly dispersed fibers is set forth.

In the following group of examples, fibers having an average length greater than 2 mm were dispersed within a starch-based composition using a two step process. First a fibrous mixture having a high yield stress, high viscosity fluid fraction was prepared, after which the remaining components were added. The result of adding fibers dramatically increased the fracture energy, toughness, and flexibility of the newly demolded articles compared to articles that have previously been prepared without the use of fibers. In addition, the articles did not require further conditioning but retained adequate flexibility due to the remainder of adequate moisture within the starch-bound cellular matrix and the strengthening effect of the fibers dispersed throughout the cellular matrix.

EXAMPLE 1

A starch-based composition mixture for use in forming foamed starch-bound articles was prepared having the following ingredients in the respective amounts:

| | |
|---|---|
| Potato Starch | 500 g |
| Calcium Carbonate (RO40) | 500 g |
| Softwood Fibers | 100 g |
| Magnesium Stearate | 10 g |
| Water | 1300 g |

The fibrous mixture was prepared by mixing together a slurry containing 100 g of the ungelatinized unmodified potato starch, 100 g fibers and 800 g of the water. The fibrous slurry was put into a microwave oven and heated up above the gelation point of potato starch (~65° C.) in order to raise the yield stress and viscosity of the fluid fraction. The mixture was blended at high shear for 10 minutes, which resulted in the complete dispersion of the fibers. Thereafter, the calcium carbonate and remaining starch and water were added to the fibrous mixture and blended to form a moldable starch-based composition, which was suitable for molding into cups, "clam-shell" sandwich containers, plates, bowls, and the like. Such articles showed greatly improved strength, toughness and flexibility compared to articles made from compositions without fibers, and could be made with far thinner walls (<2 mm) compared to articles made without fibers (~5 mm).

EXAMPLES 2–16

Different starch-based compositions having five different types of starches, varying water contents, and uniformly dispersed fibers were prepared, which were suitable for molding into a variety of foamed, starch-bound articles. Each of the moldable mixtures of these examples had the following basic mix design:

| | |
|---|---|
| Starch | 500 g |
| Calcium Carbonate (RO40) | 500 g |
| Softwood fiber (C33) | 100 g |
| Water | variable |
| Magnesium Stearate | 20 g |

The starches that were utilized in the various starch-based compositions of these examples included Western Polymer potato starch, Collamyl 910050 potato starch, Waxy Corn 7351, Staley Pearl corn starch, and Sta Lok 400 modified potato starch. The water content of the moldable mixtures varied at levels of 900 g, 1100 g, and 1300 g per 500 g of starch used. The softwood fibers were included at a level of 10% by weight of the combined starch and calcium carbonate. A stock fibrous sheet comprising individual softwood fibers was broken into small fragments before being added to the fibrous mixture. Colored water was made by adding 2.55 g Egg Yellow, 0.52 g Blue, and 0.34 g Double Strength Red, all colors of Iris brand, to 100 g of the water used in each mixture.

Each of the starch-based compositions of Examples 2–16 were prepared by the following procedure. The total 100 g amount of chopped fiber pieces was soaked in 800 g of the water for about 30 minutes. The soaked fibers and water were then placed in a mixing bowl of either a Hobart or Kitchen Aid mixer and mixed at slow to medium speed for about 4 minutes to form a fibrous slurry. The mixing action broke the fibrous sheet fragments into small fibrous clumps or nodules. A weighed quantity of 100 g of unmodified starch was then added to the initial mixture and the mixing was continued at medium speed for 1 minute to form a fibrous slurry including ungelatinized starch granules. The fibrous slurry was then placed in a plastic beaker and subjected to microwave energy in a standard kitchen microwave oven for 10 minutes at high power in order to gelate the starch. The hot, thickened mixture was removed from the microwave oven and was mixed at slow, medium, and high speeds for a total of 15 minutes to disperse the fibers therein, thus forming a fibrous mixture having substantially homogeneously dispersed fibers throughout the fluid fraction.

The calcium carbonate, an additional 400 g of unmodified starch, the remaining water, and 20 g of magnesium stearate were added to the fibrous mixture, which was mixed at slow to medium speed with additional water for about 5 minutes to form the final homogeneous starch-based compositions. The additional water included 100 g of colored water.

The starch-based compositions were molded by placing a measured portion between male and female molds designed to produce "clam shell" sandwich containers. The molding time was 75 seconds, with the temperature of the female molds being 180° C. and the temperature of the male molds being 190° C. Summarized below is a list of the selected starches used with the varying amounts of water in Examples 2–16, as well as the resulting properties of the clam shell containers formed from each of the moldable mixtures.

| Example | Starch | Water Content (g) | K (W/m·K) | Thickness (mm) | Moisture (Wt-%) | Spec. Grav. (g/cm³) | Shell Wt. (g) |
|---|---|---|---|---|---|---|---|
| 2 | Western Polymer | 900 | 0.065 | 1.643 | 4.808 | 0.358 | 31.44 |
| 3 | Western Polymer | 1100 | 0.057 | 1.660 | 4.603 | 0.306 | 24.66 |
| 4 | Western Polymer | 1300 | 0.062 | 1.635 | 5.094 | 0.234 | 20.47 |
| 5 | Collamyl | 900 | 0.064 | 1.643 | 4.549 | 0.310 | 27.37 |
| 6 | Collamyl | 1100 | 0.055 | 1.593 | 4.536 | 0.251 | 21.47 |
| 7 | Collamyl | 1300 | 0.052 | 1.493 | 4.683 | 0.237 | 16.03 |
| 8 | Waxy Corn | 900 | 0.059 | 1.618 | 4.340 | 0.296 | 24.59 |
| 9 | Waxy Corn | 1100 | 0.054 | 1.220 | 4.302 | 0.246 | 15.61 |
| 10 | Waxy Corn | 1300 | 0.056 | 1.543 | 4.188 | 0.229 | 17.77 |
| 11 | Staley Pearl | 900 | 0.066 | 1.663 | 4.077 | 0.458 | 34.82 |
| 12 | Staley Pearl | 1100 | 0.063 | 1.660 | 4.054 | 0.291 | 27.32 |
| 13 | Staley Pearl | 1300 | 0.061 | 1.671 | 3.936 | 0.273 | 22.56 |
| 14 | Sta Lok 400 | 900 | 0.065 | 1.317 | 5.196 | 0.409 | 28.55 |
| 15 | Sta Lok 400 | 1100 | 0.063 | 1.500 | 4.670 | 0.306 | 22.83 |
| 16 | Sta Lok 400 | 1300 | 0.061 | 1.510 | 4.988 | 0.238 | 18.90 |

As shown above, increasing the amount of water from 900 g to 1300 g in the moldable mixtures of the above examples generally resulted in a decrease in clam shell weight and specific gravity. Weights were lowest for the waxy corn starch and highest for the unmodified corn starch (Staley Pearl), with the potato starches in between. Three measurements were recorded for the thermal conductivity of the walls of the clam shells and the average K value was reported. The thermal conductivity (K) of the formed products generally decreased as the density decreased with increasing water content in the starch-based compositions. Changing the starch-based thickener/binder yielded different thermal conductivity values and changed the relationship between density and thermal conductivity somewhat. It appears that the inclusion of uniformly dispersed fibers within the starch-based compositions greatly assisted in the ability to vary the water content and thereby obtain articles having greatly varying densities and thermal conductivities.

Mechanical properties of the formed clam shells of Examples 2–16 were also tested, including flexural strength, fracture energy, and strain, which are summarized below.

| Example | Flexural Strength (MPa) | Fracture Energy (J/m²) | Strain Before Failure (%) |
|---|---|---|---|
| 2 | 6.2 | 740 | 2 |
| 3 | 5.5 | 780 | 1.8 |
| 4 | 4.5 | 650 | 1.7 |
| 5 | 5.5 | 600 | 1.7 |
| 6 | 4.3 | 620 | 1.6 |
| 7 | 2.5 | 430 | 1.5 |
| 8 | 3.8 | 500 | 1.7 |
| 9 | 3 | 350 | 1.65 |
| 10 | 2.5 | 200 | 1.65 |
| 11 | 11 | 680 | 1.85 |
| 12 | 7 | 550 | 1.6 |
| 13 | 6 | 480 | 1.55 |

-continued

| Example | Flexural Strength (MPa) | Fracture Energy (J/m²) | Strain Before Failure (%) |
|---|---|---|---|
| 14 | 5.2 | 570 | 2.1 |
| 15 | 4.8 | 350 | 1.45 |
| 16 | 4.5 | 270 | 1.3 |

As shown above, as the water content of the starch-based composition was increased from 900 g to 1300 g, which caused a decrease in the density of the formed products, the strength decreased, the fracture energy generally decreased, and the strain before failure decreased. However, even with relatively large amounts of water, articles with adequate strength and toughness were possible as a result of the inclusion of uniformly dispersed fibers.

EXAMPLE 17–55

Clam shell containers were formed from various starch-based compositions comprising 500 g of Sta Lok 400 potato starch, 500 g of calcium carbonate, 20 g of magnesium stearate, and a varying fiber and water content. The fibers used were softwood fibers. Each of the starch-based compositions of these examples were then molded to form clam shell containers.

Summarized below is a list of the fiber amounts, including 5%, 10%, 15%, and 20% by weight fiber, and varying amounts of water ranging from 800 g to 1500 g used in Examples 17–55, along with the final weight of the clam shell formed. The mechanical properties of Examples 17–32 and 41–55 were tested, including flexural strength, strain, and fracture energy, which are also summarized below.

| Example | Fiber (wt. %) | Water (g) | Final wt. (g) | Flexural Strength (MPa) | Strain Before Failure (%) | Fracture Energy (J/m) |
|---|---|---|---|---|---|---|
| 17 | 5 | 800 | 28.9 | 3.5 | 1.7 | 450 |
| 18 | 5 | 900 | 26.6 | 3.6 | 1.6 | 410 |
| 19 | 5 | 1000 | 23.2 | 3.1 | 1.65 | 350 |
| 20 | 5 | 1100 | 22.4 | 2 | 1.3 | 200 |
| 21 | 5 | 1200 | 20 | 2.5 | 1.6 | 300 |
| 22 | 5 | 1300 | 18.9 | 3 | 1.6 | 375 |
| 23 | 5 | 1400 | 18.3 | 1.6 | 1.3 | 110 |
| 24 | 5 | 1500 | 16 | 1.4 | 1.2 | 100 |
| 25 | 10 | 800 | 33.8 | 4.4 | 2.05 | 720 |
| 26 | 10 | 900 | 27.7 | 4.4 | 1.9 | 930 |
| 27 | 10 | 1000 | 27.8 | 2.8 | 2.8 | 460 |
| 28 | 10 | 1100 | 26.1 | 3.3 | 1.8 | 550 |
| 29 | 10 | 1200 | 24.4 | 3 | 1.7 | 740 |
| 30 | 10 | 1300 | 21.7 | 2 | 2.4 | 470 |
| 31 | 10 | 1400 | 21.2 | 3.2 | 1.9 | 640 |
| 32 | 10 | 1500 | 20.7 | 2.5 | 1.65 | 620 |
| 33 | 10 | 800 | 35.6 | — | — | — |
| 34 | 10 | 900 | 32.8 | — | — | — |
| 35 | 10 | 1000 | 29.1 | — | — | — |
| 36 | 10 | 1100 | 27 | — | — | — |
| 37 | 10 | 1200 | 26.2 | — | — | — |
| 38 | 10 | 1300 | 23.6 | — | — | — |
| 39 | 10 | 1400 | 23.9 | — | — | — |
| 40 | 10 | 1500 | 21.5 | — | — | — |
| 41 | 15 | 800 | 43 | 8.5 | 2.2 | 1430 |
| 42 | 15 | 900 | 39.4 | 8.3 | 1.85 | 1210 |
| 43 | 15 | 1000 | 36.6 | 7.2 | 2.25 | 800 |
| 44 | 15 | 1100 | 32.7 | 4.8 | 2 | 730 |
| 45 | 15 | 1200 | 32.3 | 5.7 | 1.75 | 880 |
| 46 | 15 | 1300 | 30.3 | 5 | 1.75 | 890 |
| 47 | 15 | 1400 | 23.8 | 3.6 | 1.55 | 720 |
| 48 | 15 | 1500 | 23.6 | 4.3 | 1.25 | 780 |
| 49 | 20 | 900 | 46.6 | 6 | 3.1 | 1050 |
| 50 | 20 | 1000 | 44.9 | 9.2 | 2.4 | 1175 |
| 51 | 20 | 1100 | 37.6 | 5.4 | 2.2 | 950 |
| 52 | 20 | 1200 | 36.3 | 7 | 2.5 | 1000 |
| 53 | 20 | 1300 | 32.1 | 5.5 | 2.25 | 1100 |
| 54 | 20 | 1400 | 31 | 5 | 2.3 | 1100 |
| 55 | 20 | 1500 | 24.7 | 2.2 | 2.4 | 475 |

As shown above, there was a steady decrease in the weight of the molded clam shells of Examples 17–55 as the water content was increased. Also, the weight of the clam shells increased as the fiber content was raised.

As shown above with respect to Examples 17–32 and 41–55, the strength of the formed products increased with fiber content, with a more dramatic increase at 15% by weight than at 20% by weight, considering the differential improvement for each additional amount of fiber. The strain improved at 20% by weight fiber, while the fracture energy was higher for increasing amounts of fiber. An increase in water content of the mixtures led to a fall in strength, especially at higher fiber contents. The strain remained similar for all water contents and showed a slight increase at intermediate water contents.

EXAMPLES 56–63

Clam shell containers were formed from starch-based compositions having waxy corn starch, with a varying fiber and water content, with the other components being the same as in Examples 17–55. The fibers used were softwood fibers in an amount of 10% by weight. The amount of water used in the moldable mixtures of Examples 56–63 ranged from 900 g to 1200 g. Each of the starch-based compositions was then molded to form clam shell containers. The amount of water for each of Examples 56–63, along with the final weight of the clam shells formed are summarized below.

| Example | Water Content (g) | Final Weight (g) | Density (g/cc) | k-factor (W/m·K) |
|---|---|---|---|---|
| 56 | 900 | 26.2 | — | — |
| 57 | 1000 | 23.4 | — | — |
| 58 | 1100 | 19.9 | — | — |
| 59 | 1200 | 19.3 | — | — |
| 60 | 900 | 24.5 | 0.21 | 0.052 |
| 61 | 1000 | 21.4 | 0.19 | 0.049 |
| 62 | 1100 | 19.4 | 0.18 | 0.053 |
| 63 | 1200 | 18.5 | 0.165 | 0.051 |

As shown above, there was a steady decrease in the weight of the molded clam shells of Examples 56–63 as the water content was increased. The density and of the formed products of Examples 60–63 was also determined and decreased as the water content of the starch-based compositions increased, while the thermal conductivity remained fairly constant. The ability to vary the water content while maintaining similar molding conditions was believed to be due to the inclusion of uniformly dispersed fibers.

EXAMPLES 64–73

Clam shell containers were formed from different starch-based compositions having two different types of unmodified starches, including Western Polymer potato starch and Staley Pearl corn starch. A varying water content of 900 to 1700 g was used, as well as 10% by weight of softwood fibers. Each of the starch-based compositions of Examples 64–73 was then molded to form the clam shell containers.

Summarized below is a list of the selected starches used with the varying amounts of water in the starch-based compositions, as well as the resulting properties of the clam shells formed from each of the starch-based compositions.

| Example | Starch | Water Content (g) | Density (g/cm³) | Weight (g) |
|---|---|---|---|---|
| 64 | Western Polymer | 900 | 0.339 | 31.48 |
| 65 | Western Polymer | 1100 | 0.274 | 23.55 |
| 66 | Western Polymer | 1300 | 0.213 | 17.82 |
| 67 | Western Polymer | 1500 | 0.206 | 14.75 |
| 68 | Western Polymer | 1700 | 0.156 | 11.91 |
| 69 | Staley Pearl | 900 | 0.384 | 30.96 |
| 70 | Staley Pearl | 1100 | 0.343 | 26.93 |
| 71 | Staley Pearl | 1300 | 0.219 | 17.86 |
| 72 | Staley Pearl | 1500 | 0.190 | 15.20 |
| 73 | Staley Pearl | 1700 | 0.231 | 15.40 |

As shown above, when the water content in the starch-based compositions of Examples 64–73 was increased, the average weights of the final products decreased, except for Example 73, in which a poor sample was obtained using 1700 g of water. Except for Example 73, the densities of the products also reduced with an increasing water content in the moldable mixtures, indicating that the decrease in weight was due to greater foaming by steam during formation of the products. The increase in density of the product of Example 73 indicated that the product formed with 1700 g of water was poor in terms of the density desired. Thus, in Examples 64–72 the weight of the products reduced as the water content increased, resulting in lighter, less dense products.

The mechanical properties of the formed clam shells of Examples 64–72 were tested, including flexural strength, fracture energy, and strain, which are summarized below.

| Example | Strength (MPa) | Fracture Energy (J/m$^2$) | Strain (%) |
|---------|----------------|---------------------------|------------|
| 64 | 4.7 | 780 | 2.1 |
| 65 | 4 | 550 | 1.7 |
| 66 | 2.7 | 370 | 2.2 |
| 67 | 2.6 | 350 | 1.5 |
| 68 | 2 | 250 | 1.6 |
| 69 | 7.2 | 660 | 1.6 |
| 70 | 5.5 | 710 | 1.8 |
| 71 | 3.6 | 520 | 1.9 |
| 72 | 3.7 | 450 | 1.3 |

As shown above, as the water content went up from 900 g to 1700 g in each of Examples 64–72, the strength generally decreased, the fracture energy generally decreased, and the strain fluctuated from a high of 2.2 % down to 1.3 %. Nevertheless, articles were formed without greatly varying the molding conditions due to the inclusion of uniformly dispersed fibers.

It was also observed that the articles of Examples 64–73 that were molded from mixtures with higher water content appeared to have the fewest and smallest pinholes in the surfaces thereof. Thus, these lightweight products would be relatively easy to coat with an appropriate coating material to increase water and grease resistance.

EXAMPLE 74

Starch/water mixtures were prepared having two sample concentrations of starch in order to determine the effect of starch concentration on the viscosity and yield stress of the resulting fluid fraction:

| Sample 1 | 50 g of Western Polymer potato starch in 800 g of water; |
|----------|----------------------------------------------------------|
| Sample 2 | 100 g of the above starch in 800 g of water. |

These samples were then microwaved for 10 minutes with frequent stirring. The stirring was needed to avoid settling of the starch. A very homogeneous fluid fraction comprising gelatinized starch and water was obtained in this manner for each of Samples 1 and 2.

On each sample, a single point measurement was made at a shear rate of 5 s$^{-1}$. Sample 1 had a viscosity of 12.5 Pa.s and Sample 2 had a viscosity of 75 Pa.s. The measurements were made on a Paar Physica MC-20 Rheometer with a cone/plate configuration. The angle of the cone was 1° with a 0.05 mm truncation. The diameter of the plate was 50 mm. The single point measurements were double checked with a 12.5 mm parallel plate.

Figure 2:
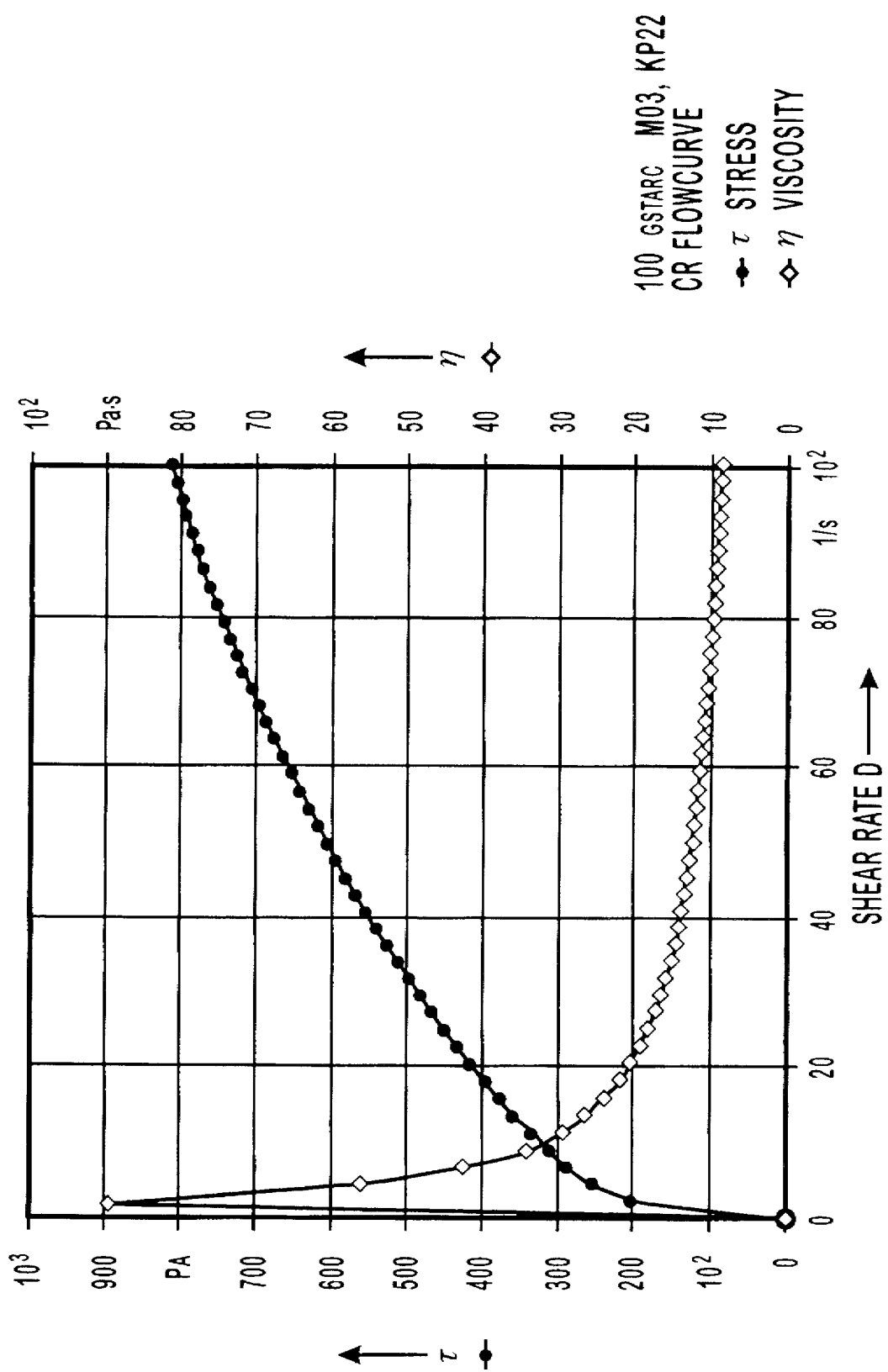
FIG. 2 shows a graph illustrating the yield stress and viscosity of a mixture containing 100 g gelated starch and 800 g water.

A flow curve was then generated with a shear rate range of 0–100 s$^{-1}$. The measurement included an up-curve generated over a period of time of greater than 180 seconds, during which the shear rate was increased, followed by a down-curve generated over a period of time of greater than 60 seconds, during which the shear rate was decreased. The down-curve was run to indicate whether there was any permanent effect of shear on the viscosity of the sample. FIGS. 1 and 2 show graphs of the flow curves (up-curves) for each of Samples 1 and 2 (the down-curves are not shown). At both concentrations of Samples 1 and 2, it was found that the down-curve deviated from the up-curve on the first measurement by a small amount. When a second measurement was made on the same sample of material, this difference disappeared, indicating a more steady state in viscosity. As shown in FIG. 1 for Sample 1, when the shear rate increased, the viscosity went down to a steady state of about 1.9 Pa.s. As shown in FIG. 2 for Sample 2, when the shear rate increased, the viscosity went down to a steady state of about 9 Pa.s.

Figure 3:
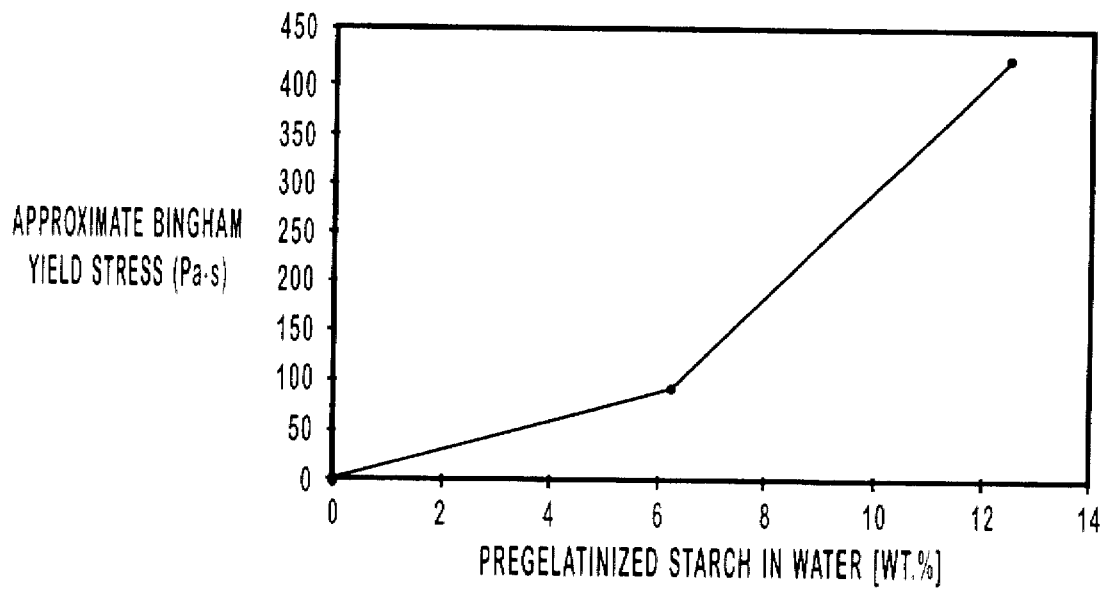
FIG. 3 shows a graph illustrating the effect of including varying amounts of pregelatinized starch on yield stress.
Figure 4:
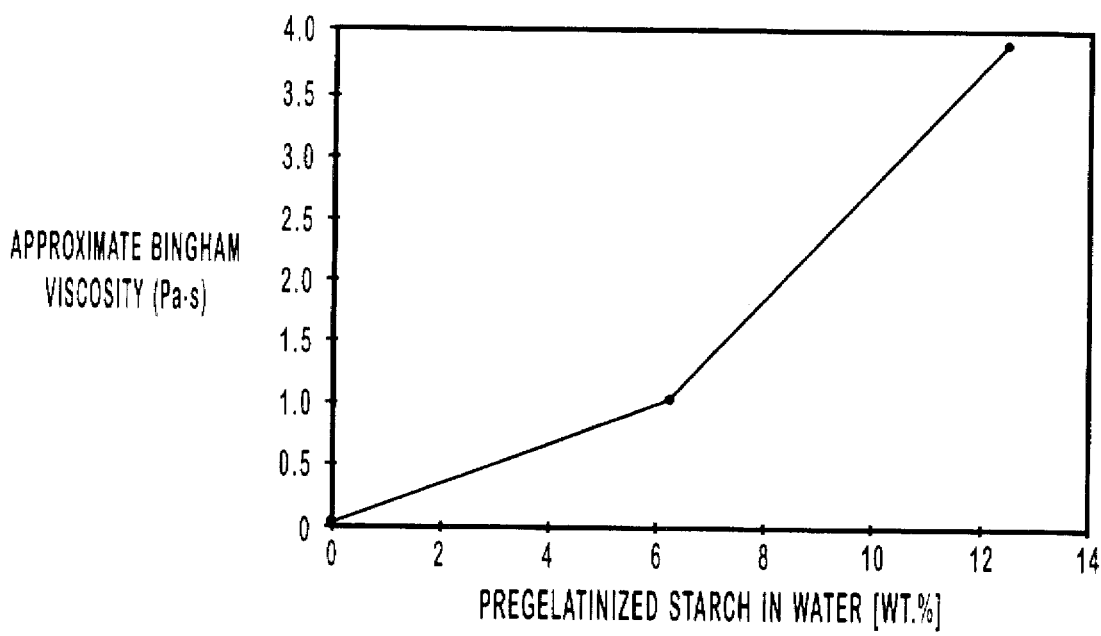
FIG. 4 shows a graph illustrating the effect of including varying amounts of pregelatinized starch on viscosity.
Figure 5:
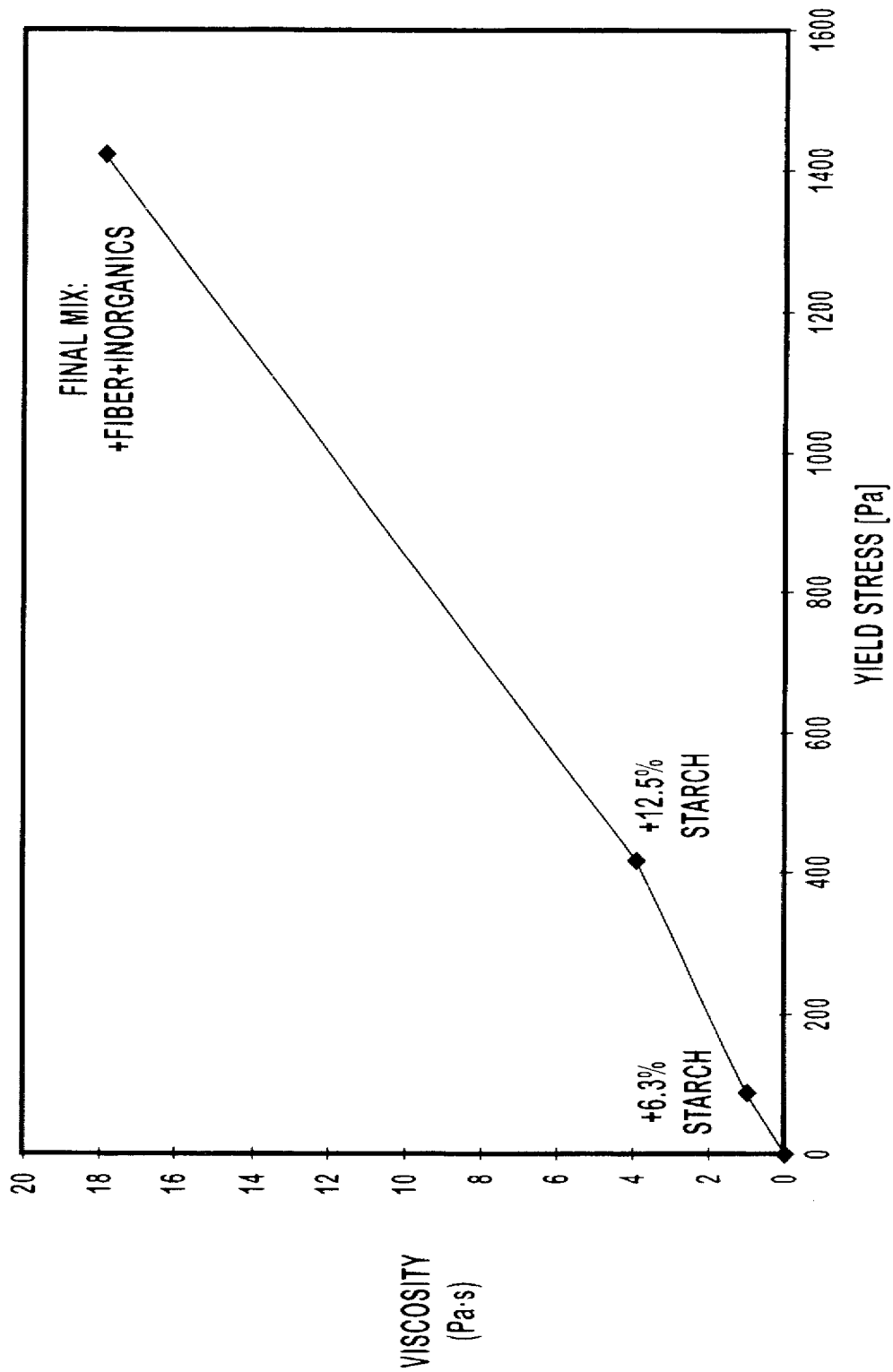
FIG. 5 shows a graph illustrating the effect of including varying amounts of pregelatinized starch on the yield stress and viscosity of a final mixture.

FIGS. 3 and 4 show the effect of the pregelatinized starch on the yield stress and viscosity of the starch/water mixtures of Samples 1 and 2. The pregelatinized starch increased both the yield stress and the viscosity dramatically from about 6.3 % by weight (50 g of starch) up to about 12.5 % by weight (100 g of starch), which is shown by the Binghamian curves of FIGS. 3 and 4. This range for the amount of pregelatinized starch used in the starch/water mixture to increase the viscosity and yield stress of the mixture will aid in dispersing fibers added thereto. FIG. 3 shows that the yield stress of the mixture increased from about 80 Pa to about 425 Pa for the above range of pregelatinized starch. FIG. 4 shows that the viscosity of the mixture increased from about 1 Pa.s to about 3.8 Pa.s for the above range of pregelatinized starch. FIG. 5 shows the yield stress versus viscosity Binghamian curve for a final mixture containing the pregelatinized starch, fibers and inorganics. The yield stress increased up to about 1400 Pa and the viscosity increased up to about 18 Pa.s for the final mixture.

EXAMPLE 75

Viscosity measurements were conducted on three samples of starch-based fiber containing mixtures having various amounts of water as follows:

| Sample 1 | 900 g water |
|----------|-------------|
| Sample 2 | 1300 g water |
| Sample 3 | 1500 g water |

A Paar-Physica instrument was used to measure the viscosity of the sample mixtures. A parallel plate configuration was used with a gap setting of 1 mm. It was determined that the measurements had to be made quickly and at relatively low shear rates to avoid segregation and fiber alignment.

Figure 6:
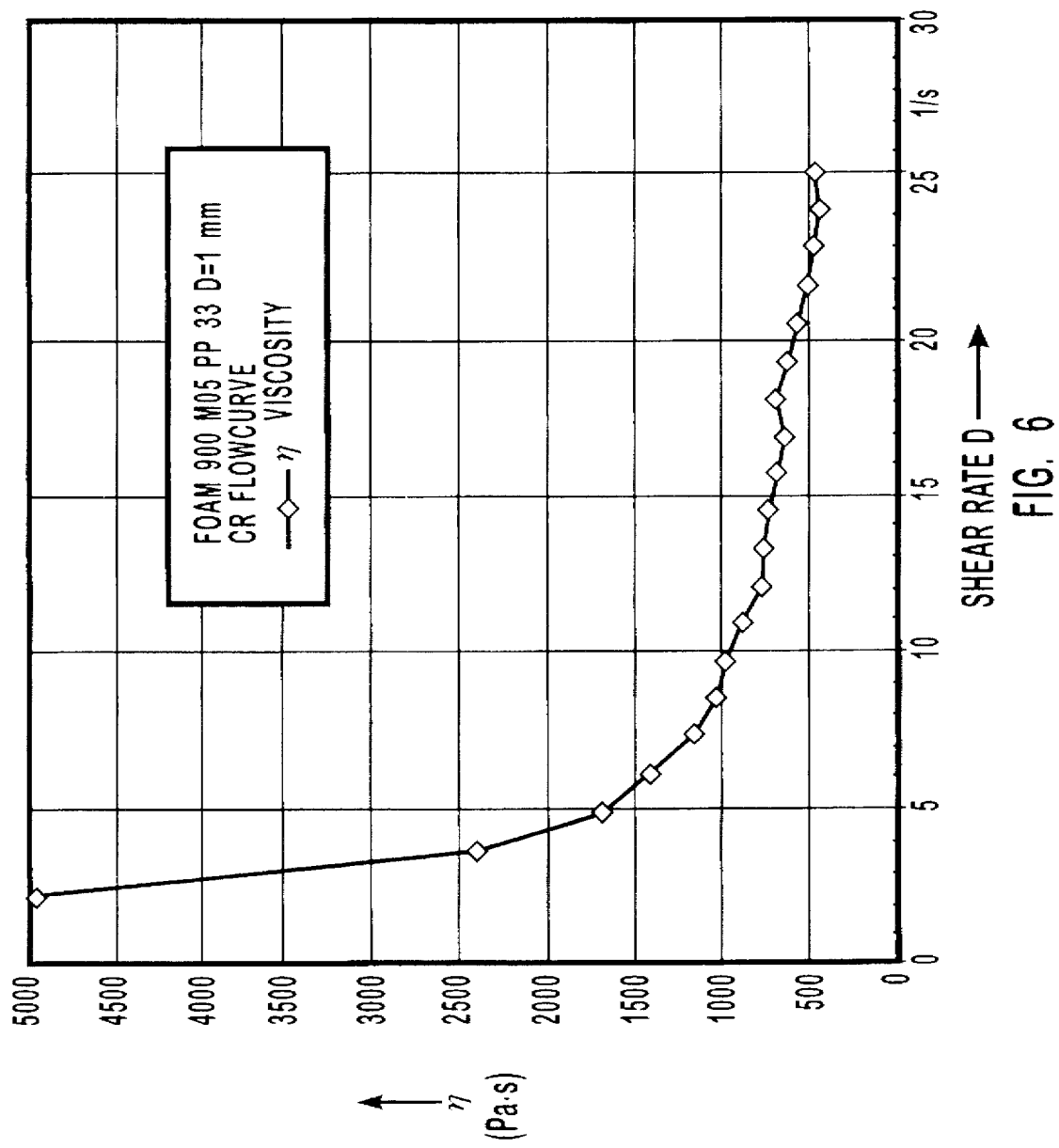
FIG. 6 shows a graph illustrating the effect of shear rate on viscosity for a moldable mixture containing 900 g water.

FIG. 6 shows a flow curve of shear rate vs. viscosity ($\eta$) for the mixture of Sample 1. FIG. 6 shows a drop in apparent viscosity with an increasing shear rate, with the viscosity stabilizing at about 500 Pa.s at a shear rate of 25 s$^{-1}$. The mixture of Sample 1 had an apparent viscosity of about 1700 Pa.s at a shear rate of 5 s$^{-1}$.

Figure 7:
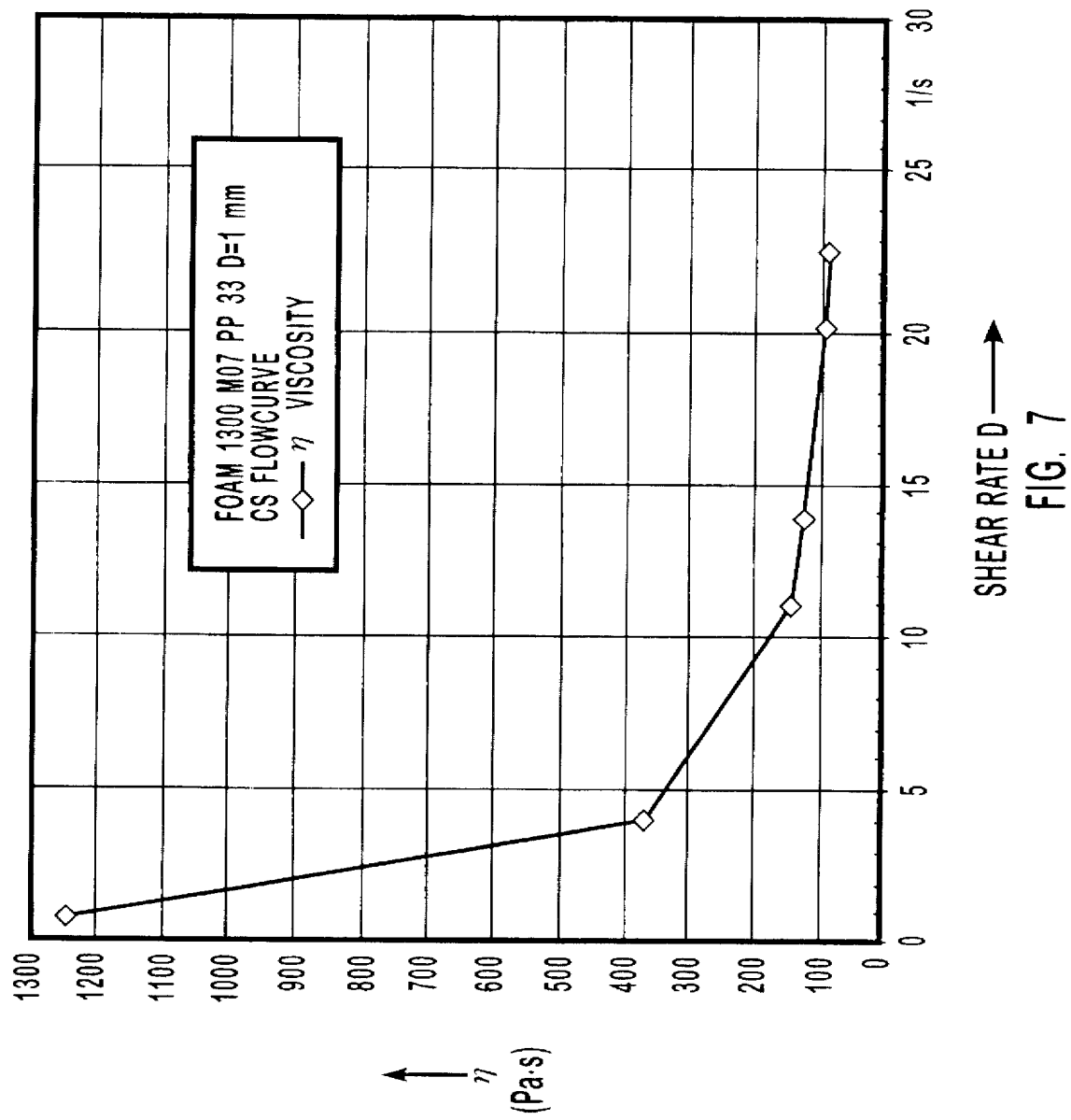
FIG. 7 shows a graph illustrating the effect of shear rate on viscosity for a moldable mixture containing 1300 g water.
Figure 8:
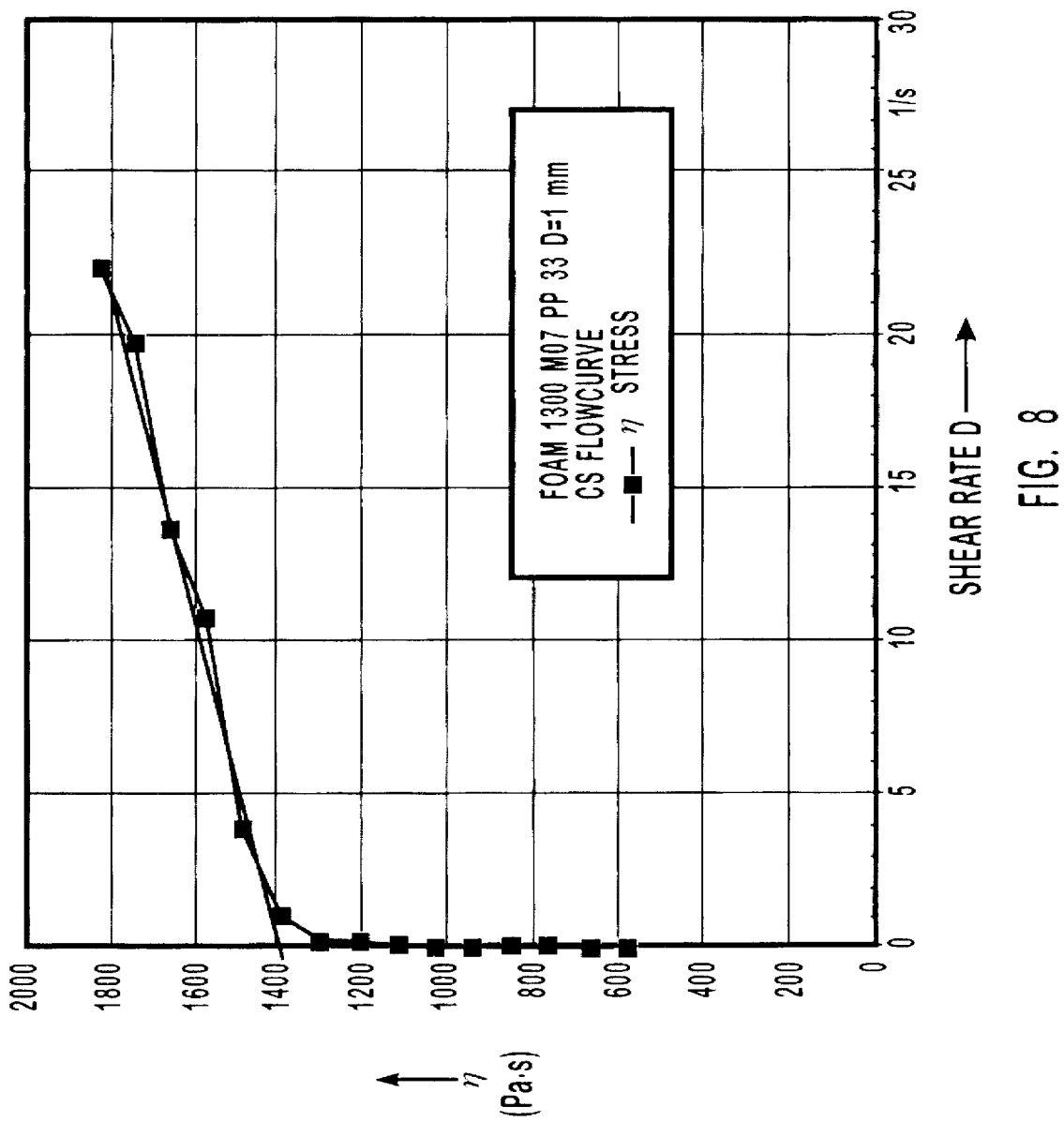
FIG. 8 shows a graph illustrating the effect of shear rate on yield stress for a moldable mixture containing 1300 g water.

FIGS. 7–8 show various flow curves for Sample 2. FIG. 7 shows a drop in apparent viscosity with an increasing shear rate, with the viscosity stabilizing at about 80 Pa.s at a shear rate of 22 s$^{-1}$. The mixture of Sample 2 had an apparent viscosity of about 340 Pa.s at a shear rate of 5 s$^{-1}$. FIG. 8 shows a flow curve of the shear rate vs. yield stress for Sample 2. The yield stress ($\tau$) increased up to 1820 Pa at a shear rate of 22 s$^{-1}$ from an initial yield stress of 1400 Pa. By calculating the difference between the increased yield stress (1820 Pa) and the initial yield stress (1400 Pa) and dividing by the shear rate (22 s$^{-1}$), the plastic viscosity was determined to be 19.1 Pa.s.

Figure 9:
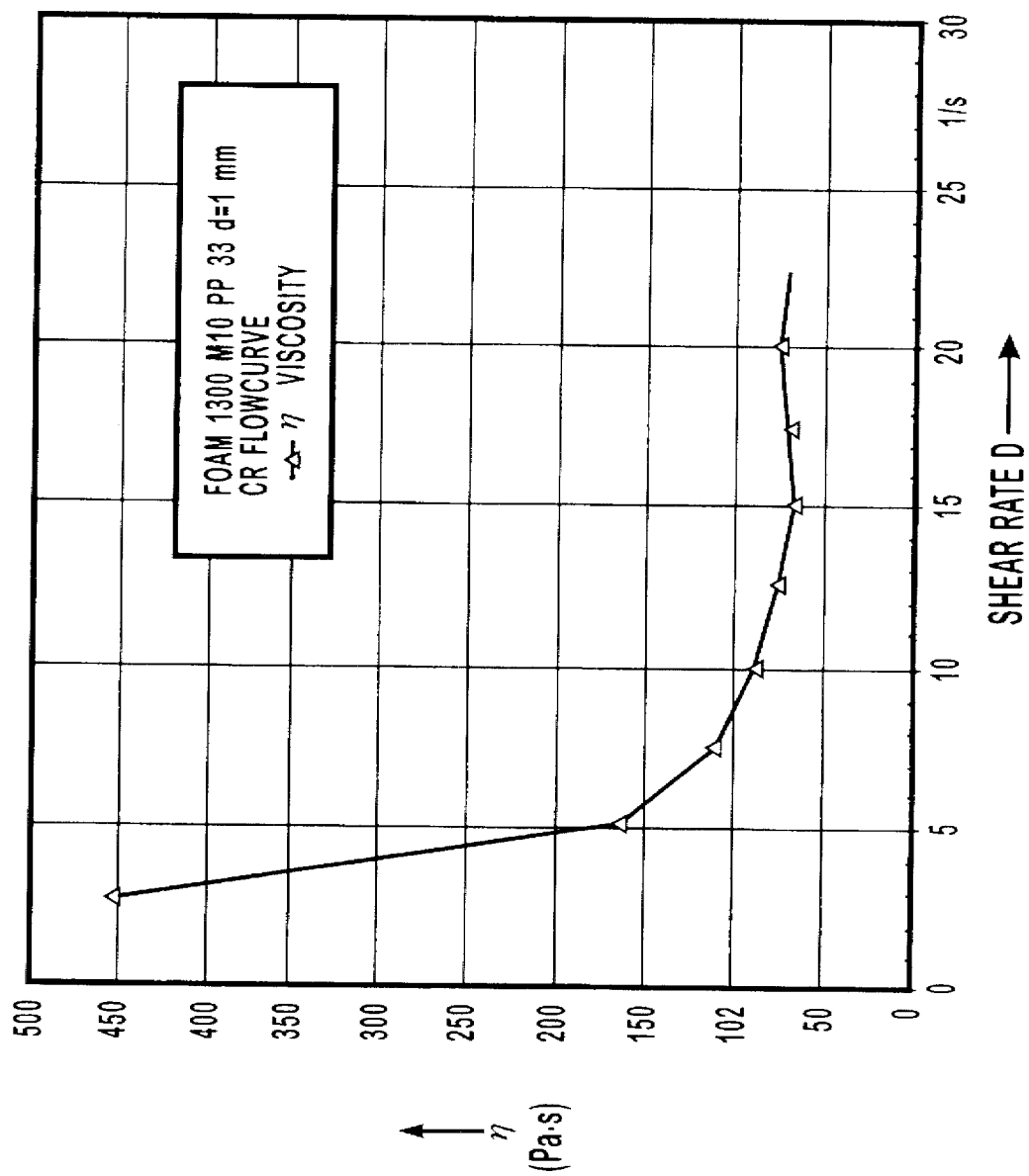
FIG. 9 shows a graph illustrating the effect of shear rate on viscosity for a moldable mixture containing 1300 g water.

FIG. 9 shows a flow curve for another mixture of Sample 2. FIG. 9 shows a drop in apparent viscosity with an increasing shear rate, with the viscosity stabilizing at about 75 Pa.s at a shear rate of 20 s$^{-1}$. This mixture of Sample 2 had an apparent viscosity of about 165 Pa.s at a shear rate of 5 s$^{-1}$.

Figure 10:
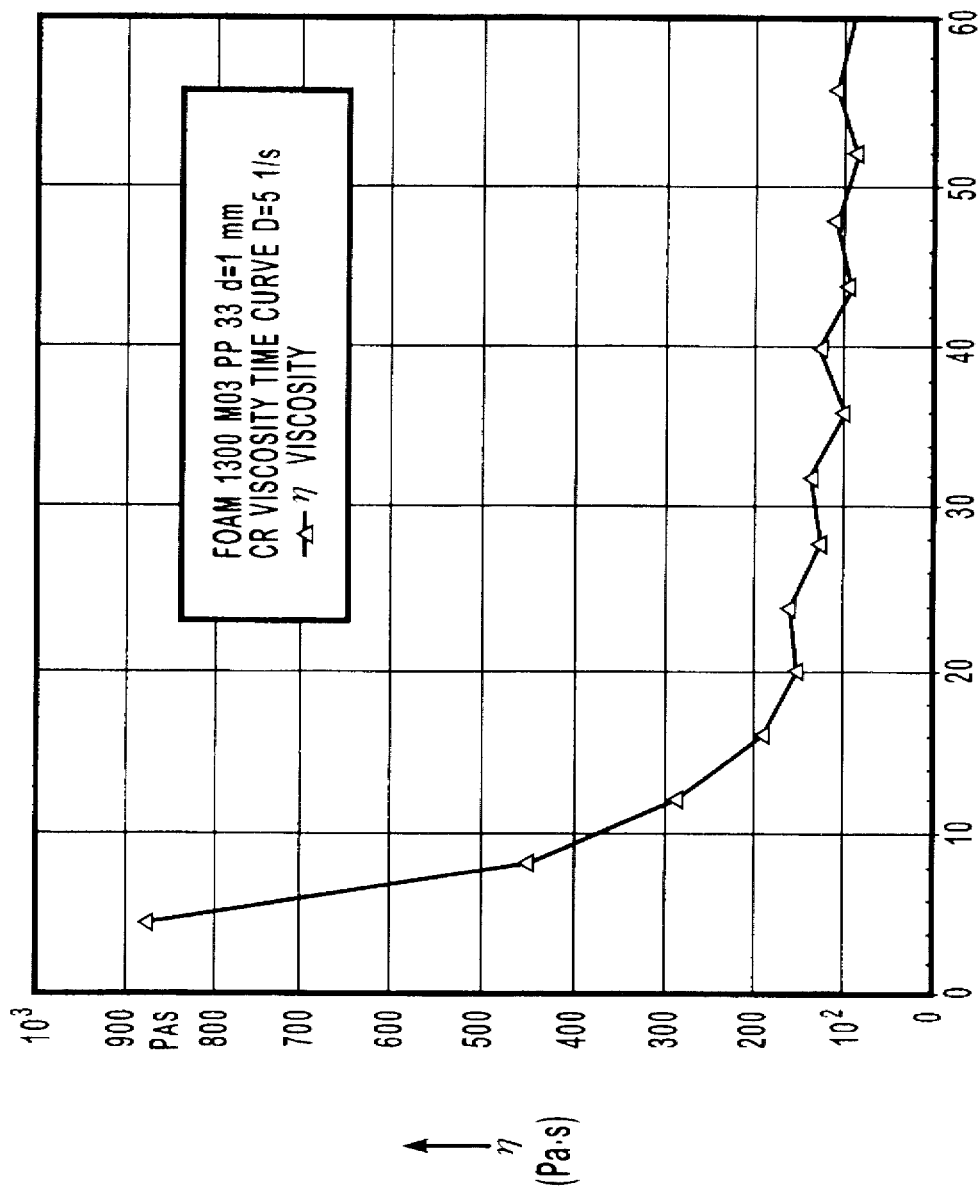
FIG. 10 shows a graph illustrating the effect of shearing time on viscosity for a moldable mixture containing 1300 g water.

FIG. 10 shows a viscosity/time curve for the mixture of Sample 2 at a shear rate of 5 s$^{-1}$. FIG. 10 shows a drop in apparent viscosity with shearing time, with the viscosity stabilizing at about 100 Pa.s. This is most likely due to the alignment of fibers in the direction of shear over time. An initial viscosity was determined after 8 seconds to be 446 Pa.s at the shear rate of 5 s$^{-1}$. This number was an average of three single point measurements that varied between 419 and 472 Pa.s.

Figure 11:
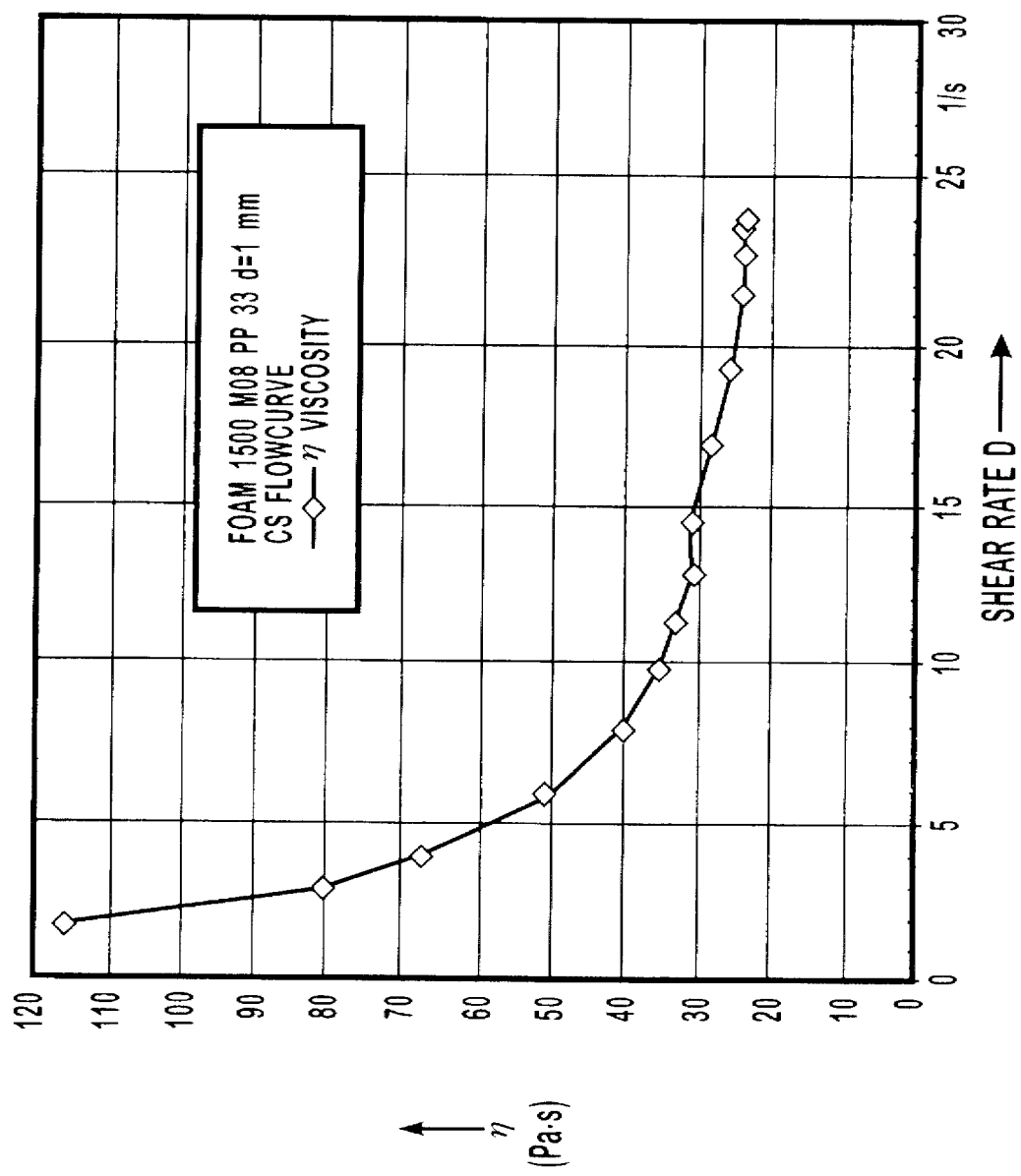
FIG. 11 shows a graph illustrating the effect of shear rate on viscosity for a moldable mixture containing 1500 g water.
Figure 12:
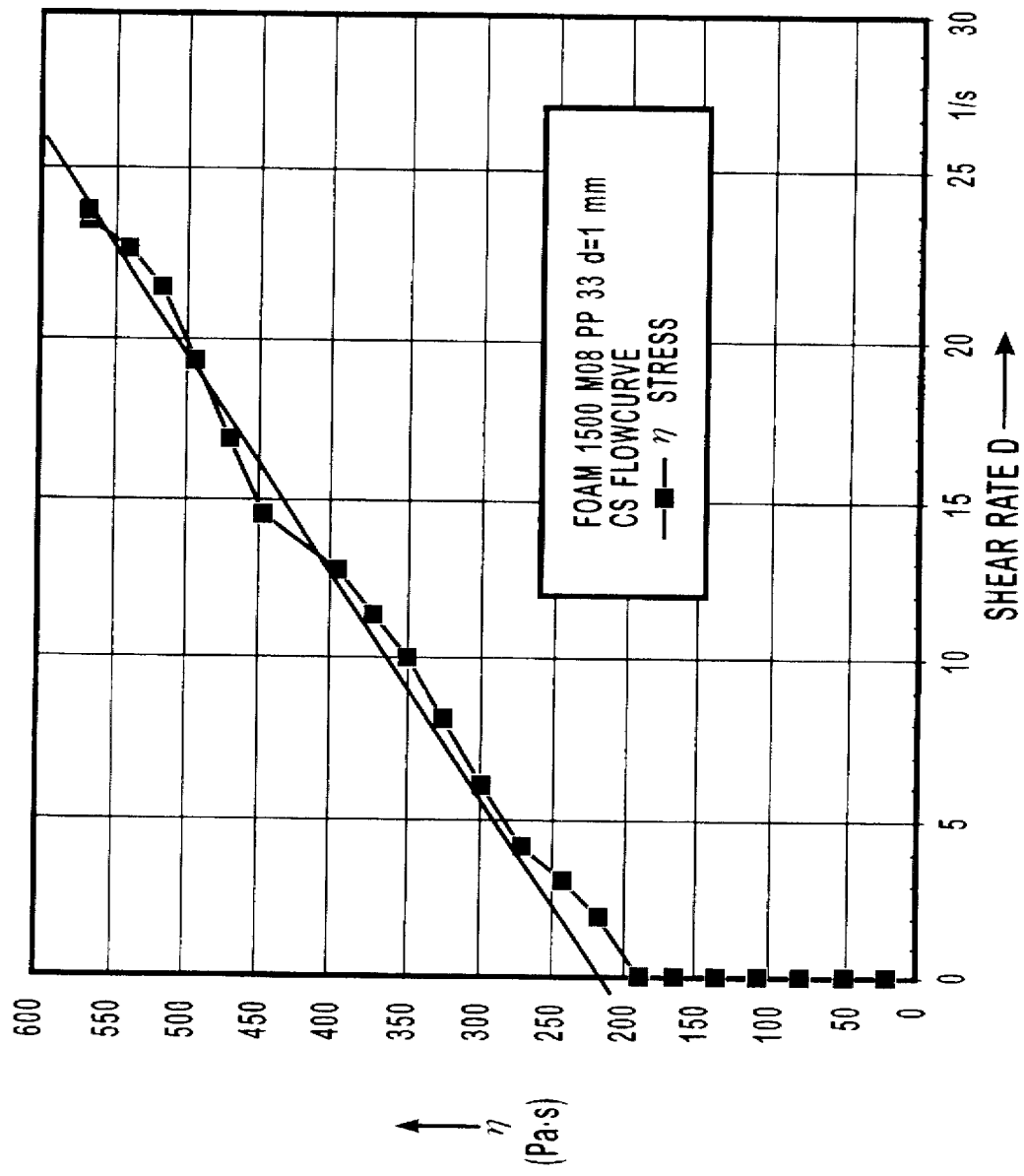
FIG. 12 shows a graph illustrating the effect of shear rate on yield stress for a moldable mixture containing 1500 g water.

FIG. 11–12 show various flow curves for Sample 3. FIG. 11 shows a drop in apparent viscosity with an increasing shear rate, with the viscosity stabilizing at about 24 Pa.s at a shear rate of 24 s$^{-1}$. The mixture of Sample 3 had an apparent viscosity of about 60 Pa.s at a shear rate of 5 s$^{-1}$. FIG. 12 shows a flow curve of the shear rate vs. yield stress for Sample 3. The yield stress increased up to 600 Pa at a shear rate of 26.5 s$^{-1}$ from an initial yield stress of 215 Pa. By calculating the difference between the increased yield stress (600 Pa) and the initial yield stress (215 Pa) and dividing by the shear rate (26.5 s$^{-1}$), the plastic viscosity was determined to be 14.5 Pa.s.

EXAMPLES 76–95

Clam shell containers were formed using various starch-based compositions. The clam shells were formed with various molding times to determine the minimum molding time necessary to produce a quality product with maximum residual moisture. The clam shells were formed from two starch-based compositions with a different water content. All of the components in the starch-based compositions were the same, except that the top portion of the clam shell was formed with 1400 g of water and the bottom portion of the clam shell was formed with 1300 g of water. The starch-based compositions had the following basic mix design:

| | |
|---|---|
| Western Polymer Potato Starch | 500 g |
| Calcium Carbonate (Georgia Marble RO40) | 500 g |
| Federal Softwood Fiber | 100 g |
| Water | 1400, 1300 g |
| Magnesium Stearate | 20 g |

The mold was heated to the following constant temperatures and was not adjusted during the molding process:

| | |
|---|---|
| Mold Core | 195° C. |
| Front Plate | 190° C. |
| Rear Plate | 190° C. |

A molding time of 30 seconds was chosen as a starting point. If the product was not of suitable quality at that molding time, the time was increased in 5 second increments until a satisfactory product was produced. When a satisfactory product was produced at a certain baking time, two more samples were produced, making three samples to average. This procedure continued to a final molding time of 130 seconds. A satisfactory product was determined as one that was form stable, with no bubbles (due to underheating), and had a smooth surface.

The weight of a sample was taken directly out of the mold. The sample was then dried in an oven at 150° C. and weighed again. The amount of moisture was determined by subtracting the dry weight from the mold weight of the sample and dividing by the mold weight. The average moisture of the three samples for each example was determined, including the top shell portions and the bottom shell portions, which were determined separately. The molding time and final moisture content of the top shell and bottom shell portions are summarized below for each of Examples 76–95.

| Example | Molding Time (sec) | Moisture (% by weight) in top shell | Moisture (% by weight) in bottom shell |
|---|---|---|---|
| 76 | 35 | 4.9 | 9.3 |
| 77 | 40 | 3.3 | 5.4 |
| 78 | 45 | 3.1 | 4.4 |
| 79 | 50 | 1.5 | 3.2 |
| 80 | 55 | 1.4 | 3.3 |
| 81 | 60 | 1.1 | 2.4 |
| 82 | 65 | 0.9 | 1.4 |
| 83 | 70 | 0.7 | 1.3 |
| 84 | 75 | 1.2 | 1.1 |
| 85 | 80 | 1.3 | 1.2 |
| 86 | 85 | 0.9 | 1.0 |
| 87 | 90 | 1.7 | 0.8 |
| 88 | 95 | 1.2 | 0.7 |
| 89 | 100 | 1.1 | 1.1 |
| 90 | 105 | 1.0 | 0.9 |
| 91 | 110 | 0.8 | 1.0 |
| 92 | 115 | 0.9 | 1.0 |
| 93 | 120 | 1.3 | 1.2 |
| 94 | 125 | 1.1 | 1.0 |
| 95 | 130 | 1.2 | 1.2 |

As shown above, there was a consistent relationship between sample moisture and baking time. The moisture in both the top shell and bottom shell portions dropped rapidly with small increases in baking time. In both portions, the residual moisture levels out between 0–1% by weight moisture at 70–75 seconds. The variations after this time in residual moisture are due to the fact that when the products come out of the mold at the higher molding times, they are essentially completely dry. These dry products absorb additional moisture from the air in the time it takes to weigh them, resulting in the variations of the moisture content.

The data for the top shell portions indicates that a molding time between 40–45 seconds is sufficient to produce a quality product. All of the samples molded at less than 35 seconds resulted in poor products, while only one sample was poor at 40 seconds and all three samples were molded sufficiently at 45 seconds. The sample averages show a product moisture of about 3.3 % by weight at 40 seconds (Example 77) and about 3.1% by weight (Example 78) at 45 seconds. Thus, the top shell portion had about 3 % by weight moisture in producing a satisfactory product.

Due to the higher density of the bottom shell portion, a longer molding time is required for the bottom shell. It was found that below 45 seconds, all of the samples were poor. A molding time of 50 seconds produced three satisfactory samples, but at a molding time of 55 seconds, one sample was again poor. Without considering the need for better heat transfer in the mold design, it was concluded that a sufficient molding time for the bottom shell portion was between 55–60 seconds (Examples 80–81). Thus, the bottom shell portion had about 2–3 % by weight moisture in producing a satisfactory product.

Thus, through the present invention, it is possible to produce a starch-based clam shell container with about 3 % by weight residual moisture directly out of the mold without the need for subsequent conditioning thereof. The large variation in water content and processing conditions while obtaining similar products is believed to be due to the inclusion of uniformly dispersed fibers.

EXAMPLES 96–101

Clam shell containers were formed using various starch-based compositions. Western Polymer potato starch was used along with various fiber types, including cotton linters and wood fibers, in the moldable mixtures of Examples 96–101. The fiber type and amount, moisture and bulk density of the formed products are summarized below for each of

| Example | Fiber type (% by weight) | Moisture (% by weight) | Density (g/cm³) |
|---|---|---|---|
| 96 | Cotton Flock D200 fine (20%) | 4.98 | 0.217 |
| 97 | Cotton Flock D260 medium (20%) | 4.90 | 0.217 |
| 98 | Cotton Flock D275 coarse (20%) | 5.04 | 0.223 |
| 99 | Alfacell C10 (20%) | 5.05 | 0.215 |
| 100 | Softwood (10%) | 5.05 | 0.225 |
| 101 | Hardwood (10%) | 5.48 | 0.198 |

The mechanical properties of the formed clam shells of Examples 96–101 were also tested, including strength (peak load), in which the formed material was bent with a 10 mm displacement over a 40 mm span, as well as the strain (at rupture), and the fracture energy. These mechanical properties are summarized below.

| Example | Strength (MPa) | Strain (%) | Fracture Energy (J/m²) |
|---|---|---|---|
| 96 | 3.501 | 1.34 | 223 |
| 97 | 3.179 | 1.68 | 406 |
| 98 | 2.33 | 1.6 | 204 |
| 99 | 2.69 | 1.27 | 173 |
| 100 | 3.865 | 1.74 | 771 |
| 101 | 3.145 | 1.35 | 452 |

As shown above, the cotton fibers were able to provide strength to the starch matrix, but had a different post-fracture behavior. The softwood fiber-containing material (Example 100) retained integrity long after the first cracks propagated in the material and the load started to decrease, indicating that it was a tougher material. The products made out of cotton fibers and Alfacell (Examples 97–99) had a more abrupt failure and were thus more brittle. The product containing medium cotton fibers (Example 97) had a strain measurement closest to that for the softwood fiber-containing product, while the product containing fine cotton fibers (Example 96) had a strength measurement closest to that for the softwood fibercontaining product.

COMPARATIVE TESTING

Two fiber reinforced starch-based compositions of the present invention were formulated and molded into clam shell containers in order to compare their mechanical properties, including strain, flexural strength, and fracture energy, to the mechanical properties of a conventional starch-based material made without fibers formed into a tray. The compositions of the invention molded into clam shells are identified below as Samples 1 and 2, while the conventional starch material is identified as Sample 3.

The ingredients and respective amounts used in the compositions of the present invention that were used to mold the inventive clam shells are summarized below for each of Samples 1 and 2. The components were mixed together by first gelating 100 g of the unmodified starch in water to form a fluid fraction and then uniformly dispersing the fibers throughout the fluid fraction by mixing.

| Ingredient | Sample 1 | Sample 2 |
|---|---|---|
| Potato Starch | 500 g | 1000 g |
| Calcium Carbonate (RO40) | 500 g | 0 |
| Softwood Fiber | 100 g | 100 g |
| Magnesium Stearate | 20 g | 20 g |
| Water | 1300 g | 1300 g |

The tray of Sample 3 was made from a conventional starch-based mixture containing no fibers or inorganic aggregates (namely, a starch-based thickener/binder, water, and mold release agent) and measured 25×25 cm. Test sections were removed from the tray of Sample 3 and from the bottom of the clam shells of Samples 1 and 2 to determine various characteristics and mechanical properties of the materials used. The thickness, moisture content, and density of the articles made from Samples 1–3 are summarized below.

| Sample | Thickness (mm) | Moisture (wt-%) | Density (g/cm³) |
|---|---|---|---|
| 1 | 2.11 | 5.05 | 0.225 |
| 2 | 2.1 | 10.74 | 0.149 |
| 3 | 3.46 | 10.78 | 0.208 |

The mechanical properties of each of Samples 1–3 were measured, including flexural strength, strain, and fracture energy, by using a three point bending test at a constant displacement rate. Both load and displacement were measured, and subsequent analysis yielded the flexural strength, the strain to failure, and the fracture energy. These mechanical properties are summarized below along with the normalized fracture energy, which was determined to take into account the varying densities of Samples 1–3.

| Sample | Flexural Strength (MPa) | Strain (%) | Fracture Energy (J/m²) | Normalized Fracture Energy (J/m²)/(g/cm³) |
|---|---|---|---|---|
| 1 | 3.865 | 1.74 | 771 | 3430 |
| 2 | 3.464 | 1.88 | 526 | 3530 |
| 3 | 2.968 | 2.1 | 156 | 750 |

As shown above, the flexural strength of the articles made using Samples 1 and 2 of the present invention was higher than the flexural strength of the articles using the conventional starch-based composition of Sample 3. It should be noted that because the article made from Sample 3 had a greater thickness (3.46 mm) compared to the thicknesses of the articles made from Samples 1 and 2 (2.11 mm and 2.1 mm), it would be expected to give an artificially high flexural strength reading compared to if it had a thickness of about 2 mm due to limitations of the testing method. Hence, if Sample 3 would have had the same thickness as Samples 1 and 2 (2.1 mm), the flexural strength of Sample 3 would be expected to have been even lower. While the strain or elongation before failure was fairly comparable for each of Samples 1–3, the fracture energy was substantially higher for the article made from Samples 1 and 2 compared to the article made from Sample 3. As shown above, the difference in fracture energies was even more dramatic between the articles made from Samples 2 and 3 because of the significantly lower density of the article made from Sample 2. The table above also shows the much higher normalized fracture energies of Samples 1 and 2 compared with the lower normalized fracture energy of the conventional starch material of Sample 3. Thus, this comparative test demonstrates that the inclusion of substantially uniformly dispersed fibers in the compositions of the present invention yields articles with higher flexural strength and dramatically higher fracture energy compared to the articles made according to the prior art.

In a second comparative test, the articles made from the compositions of Samples 1–3 were tested for tensile strength and other properties. An additional composition made according to the present invention, identified as Sample 4, was prepared as above and formed into a clam shell article. A standard starch-based composition without fibers, identified as Sample 5, was also formed into a clam shell article. Finally, an article in the shape of a plate was obtained that was manufactured from a second conventional starch-based material identified as Sample 6. The components and their respective amounts within each of the compositions of Samples 4–6 are set forth below.

| Component | Sample 4 | Sample 5 | Sample 6 |
|---|---|---|---|
| Potato Starch | 1000 g | 1000 g | 495 g |
| Vegetable oil mixed with Cetodan (emulsified monoglyceride) | 0 | 0 | 50 g (47 g oil and 3 g Cetodan) |
| Softwood fiber | 50 g | 0 | 0 |
| Mold release agent | 20 g | 20 g | 5 g |
| Water | 1300 | 1300 | 500 |

Sample pieces of the various articles that were tested were prepared as follows for testing. The samples to be tested were cut out of the bottom portions of the clam shells of Samples 1–2 and 4–5 and from the tray and plate of Samples 3 and 6, respectively. The samples for tensile testing were cut to a 25 mm× 60 mm dimension. Since the mechanical properties of starch-based materials are generally sensitive to moisture content and can change over time, depending on the ambient moisture conditions to which they are exposed, the moisture contents within all six test samples were equilibrated in order to yield more reliable comparative test results. In particular, the test samples were placed in a humidity chamber at 25° C. and at 52% relative humidity for a period of about 12 hours, thereby equalizing the moisture within each of the test samples to about 10% by weight of the starch content. The moisture within each of the samples was maintained at this level until the moment they were tested.

Brass shim stock (0.005 inches in thickness) was attached to each end of a sample to provide means for securing the sample to the testing machine for applying a tension, or tensile stress. The shims were attached to the samples with an overlap of 15 mm on each end and an overhang of about 15 mm. Super glue was used to attach the shims due to its quick curing time and high shear strength.

The tensile strengths of each of the test samples were tested using an Instron 8501 machine using the Series 9 program. The grips were about 70 mm apart and the tested sample was held by the overhanging portion of the brass shims thereon. It was assumed that the indirect application of a load to the shims would not measurably affect the test results as the stiffness of the brass shims was about 1000 times that of the starch-based materials of the test samples.

The test was conducted under displacement control, wherein the loading rate was held constant at 10 mm per minute. Displacement, or elongation, was allowed to proceed until a complete rupture of the sample was achieved, i.e., where the sample could no longer resist a load.

The tensile strength was calculated by dividing the maximum load by the cross-sectional area at the plane of fracture. The amount of strain before failure was calculated by dividing the displacement at maximum load by the gauge length (length of sample between the shims). It was assumed that the strain in the shims was negligible due to the much higher stiffness thereof. The fracture energy was calculated by computing the area under the load displacement curve (to the point of complete rupture of the test sample) and dividing it by the sample area at the plane of fracture.

The above mechanical properties, as well as the density and starch content (weight fraction) of the materials of Samples 1–6, are summarized as follows.

| Sample | Density (g/cm³) | Starch weight fraction | Tensile Strength (MPa) | Strain (%) | Fracture Energy (J/m²) |
|---|---|---|---|---|---|
| 1 | 0.243 | 0.45 | 1.407 | 1.44 | 831 |
| 2 | 0.196 | 0.89 | 1.88 | 1.57 | 723 |
| 3 | 0.209 | 0.98 | 1.08 | 1.83 | 573 |
| 4 | 0.192 | 0.93 | 1.8 | 1.64 | 678 |
| 5 | 0.145 | 0.98 | 0.93 | 1.6 | 397 |
| 6 | 0.13 | 0.89 | 1.04 | 1.4 | 388 |

As the table shows, the tensile strengths and fracture energies are significantly greater with respect to articles made from the compositions of Samples 1, 2, and 4, which include substantially uniformly dispersed fibers. The mechanical properties of tensile strength and fracture energy were then normalized with respect to the density and the starch weight fraction for each of Samples 1–6. The results are summarized below.

| Sample | Normalized Tensile Strength MPa/[(g/cm3) · weight fraction of starch] | Normalized Fracture Energy (J/m²)/[g/cm³) · weight fraction of starch] |
|---|---|---|
| 1 | 13 | 7599 |
| 2 | 11 | 4142 |
| 3 | 5 | 2798 |
| 4 | 10 | 3796 |
| 5 | 7 | 2795 |
| 6 | 9 | 3356 |

As shown above, the normalized tensile strengths and fracture energies of the articles of Samples 1, 2 and 4, which were made according to the present invention, were significantly higher than the conventional materials of Samples 3, 5, and 6 that contained no fibers, particularly with respect to the tensile strength and fracture energy of Sample 1, which contained considerably less starch per unit weight of the article by virtue of the inclusion of a high inorganics content. This comparative test demonstrates that the inclusion of uniformly dispersed fibers substantially increased both the tensile strength and the fracture energy of the starch-based materials of the invention per unit starch, particularly where a large amount of calcium carbonate was included.

VI. SUMMARY.

From the foregoing, it will be appreciated that the present invention provides compositions and methods for manufacturing novel starch-bound materials that can replace thermoplastics and other conventional materials for producing packaging materials and other articles.

The present invention further provides compositions and methods for improving the dispersion of fibers within starch-bound materials without the use of large quantities of water.

The present invention additionally provides compositions and methods that provide for the more thorough dispersion of fibers, particularly relatively long-length fibers (i.e., those having an average length greater than about 2 mm) and/or fibers of high aspect ratio (i.e., at least about 25:1) within starch-based compositions.

Moreover, the present invention provides fiber-filled compositions that yield starch-bound articles that have properties similar, or even superior, to thermoplastics and other conventional materials.

The present invention further provides compositions and methods that yield hardened starch-bound articles that do not require the addition of synthetic polymers or prolonged, high-humidity conditioning in order to obtain the required strength and toughness.

The present invention also provides compositions and methods which yield starch-bound articles which do not require the application of a coating or the inclusion of a synthetic polymer to maintain the proper moisture within the starch-based articles.

The present invention additionally provides compositions and methods that allow for the manufacture of starch-bound articles through a gelation/retrogradation process having varying cross-sectional thicknesses throughout the same article.

The present invention further provides compositions and methods that make possible the manufacture of articles at a cost that is comparable to, or even less than, existing methods of manufacturing containers or other articles from thermoplastics or other conventional materials.

The present invention additionally provides compositions and methods that yield articles having a similar cross-section and comparable mechanical properties of, e.g., strength, toughness, and flexibility, compared to thermoplastics or other conventional materials.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for dispersing fibers within a fibrous composition comprising the steps of:
   (a) combining together water, fibers, and a thickening agent such that the thickening agent and water interact together to form a fluid fraction that is characterized by a yield stress and viscosity that enables the fibers to be substantially uniformly dispersed throughout the fibrous composition as the fibers and fluid fraction are mixed together, the fibers having an average length greater than about 2 mm and an average aspect ratio greater than about 25:1; and
   (b) mixing together the combined thickening agent, water, and fibers in order to substantially uniformly disperse the fibers throughout the fibrous composition.

2. A method as defined in claim 1, wherein the thickening agent comprises a starch-based thickener.

3. A method as defined in claim 2, wherein the starch-based thickener includes a pregelatinized starch.

4. A method as defined in claim 2, wherein the starch-based thickener includes a modified starch.

5. A method as defined in claim 2, wherein the starch-based thickener includes an unmodified starch having a gelation temperature and wherein the fluid fraction is formed by interacting the unmodified starch with water heated to at least the gelation temperature of the unmodified starch.

6. A method as defined in claim 1, wherein the thickening agent is included in an amount in a range from about 5% to about 40% by weight of the fluid fraction.

7. A method as defined in claim 1, wherein the thickening agent is included in an amount in a range from about 8% to about 25% by weight of the fluid fraction.

8. A method as defined in claim 1, wherein the thickening agent is included in an amount in a range from about 10% to about 15% by weight of the fluid fraction.

9. A method as defined in claim 1, wherein step (a) comprises the steps of:
   (i) placing together at least a portion of the water and fibers to form a fibrous slurry;
   (ii) adding the thickening agent to the fibrous slurry; and
   (iii) causing the thickening agent and water to interact together to form the fluid fraction.

10. A method as defined in claim 1, wherein step (a) comprises the steps of:
    (i) placing together at least a portion of the water and thickening agent;
    (ii) causing the thickening agent and water to interact together to form the fluid fraction; and
    (iii) adding the fibers to the fluid fraction.

11. A method as defined in claim 1, wherein step (a) comprises the steps of:
    (i) placing together the fibers and thickening agent;
    (ii) blending water with the fibers and thickening agent such that the water and thickening agent interact together to form the fluid fraction.

12. A method as defined in claim 1, wherein step (a) comprises the steps of:
    (i) placing together the water, thickening agent, and fibers; and
    (ii) causing the thickening agent and water to interact together to form the fluid fraction.

13. A method as defined in claim 1, wherein the yield stress of the fluid fraction is greater than about 10 Pa.

14. A method as defined in claim 1, wherein the yield stress of the fluid fraction is in a range from about 20 Pa to about 2000 Pa.

15. A method as defined in claim 1, wherein the yield stress of the fluid fraction is in a range from about 50 Pa to about 1000 Pa.

16. A method as defined in claim 1, wherein the yield stress of the fluid fraction is in a range from about 100 Pa to about 500 Pa.

17. A method as defined in claim 1, wherein the apparent viscosity of the fluid fraction measured at a shear rate of 5 $s^{-1}$ is greater that about 3 Pa.s.

18. A method as defined in claim 1, wherein the apparent viscosity of the fluid fraction measured at a shear rate of 5 $s^{-1}$ is in a range from about 5 Pa.s to about 1000 Pa.s.

19. A method as defined in claim 1, wherein the apparent viscosity of the fluid fraction measured at a shear rate of 5 $s^{-1}$ is in a range from about 10 Pa.s to about 500 Pa.s.

20. A method as defined in claim 1, wherein the apparent viscosity of the fluid fraction measured at a shear rate of 5 $s^{-1}$ is in a range from about 30 Pa.s to about 200 Pa.s.

21. A method as defined in claim 1, wherein the water, thickening agent, and fibers are mixed together for a period of time in a range from about 10 minutes to about 2 hours.

22. A method as defined in claim 1, wherein the water, thickening agent, and fibers are mixed using a kneader mixer.

23. A method as defined in claim 1, wherein the water, thickening agent, and fibers are mixed using a high shear mixer.

24. A method as defined in claim 1, wherein the water, thickening agent, and fibers are mixed using a twin auger extruder.

25. A method as defined in claim 1, wherein the fluid fraction is characterized as having an approximate Binghamian flow.

26. A method as defined in claim 1, wherein the fibers have an average length in a range from about 2 mm to about 25 mm.

27. A method as defined in claim 1, wherein the fibers have an average aspect ratio greater than about 100:1.

28. A method as defined in claim 1, wherein the fibers have an average aspect ratio greater than about 1000:1.

29. A method as defined in claim 1, wherein the fibers comprise natural cellulosic fibers.

30. A method as defined in claim 1, wherein the fibers comprise synthetic organic fibers.

31. A method as defined in claim 1, wherein the fibers comprise inorganic fibers.

32. A method as defined in claim 1, wherein the substantially uniformly dispersed fibers have a concentration in a range from about 1% to about 40% by weight of the fibrous mixture.

33. A method as defined in claim 1, wherein the fibers are combined into the fibrous mixture in an amount in a range from about 2% to about 80% by weight of solids in the fibrous mixture.

34. A method as defined in claim 1, further including adding a volatile, water-miscible organic solvent to the fibrous composition.

35. A method as defined in claim 1, further including adding a mineral filler to the fibrous composition.

36. A method as defined in claim 1, further including adding a solid organic filler to the fibrous composition.

37. A method as defined in claim 1, further including adding a dispersant to the fibrous composition.

38. A method as defined in claim 1, further including adding a humectant to the fibrous composition.

39. A method as defined in claim 1, further including adding a mold release agent to the fibrous composition.

40. A method as defined in claim 1, further including adding an enzyme to the fibrous composition.

41. A method as defined in claim 1, further including adding an unmodified starch-based binder to the fibrous composition.

42. A method as defined in claim 1, further including adding an integral sealing material to the fibrous composition.

43. A method for dispersing fibers within a starch-based composition comprising the steps of:

(a) combining water and fibers having an average length greater than about 2 mm and an average aspect ratio greater than about 25:1 to form a fibrous slurry;

(b) blending a starch-based thickening agent with the fibrous slurry such that the water and thickening agent interact together to form a fluid fraction that is characterized by a yield stress and viscosity that enable the fibers to be substantially uniformly dispersed throughout the starch-based composition as the fibers and fluid fraction are mixed together; and (c) mixing together the fibers and fluid fraction in order to substantially uniformly disperse the fibers throughout the starch-based composition.

44. A method for dispersing fibers within a starch-based composition comprising the steps of:

(a) combining water and a starch-based thickening agent such that they interact together to form a fluid fraction that is characterized by a yield stress and viscosity that enables fibers to be substantially uniformly dispersed throughout the starch-based composition as the fibers and fluid fraction are mixed together; and (b) mixing fibers into the fluid fraction in order to substantially uniformly disperse the fibers throughout the starch-based composition without substantial further addition of heat to the starch-based composition, the fibers having an average length greater than about 2 mm and an average aspect ratio greater than about 25:1.

45. A method for dispersing fibers within a starch-based composition comprising the steps of:

(a) combining water, fibers, and a starch-based thickening agent to form a fibrous slurry having a concentration of fibers in a range from about 1% to about 40% by weight of the fibrous slurry, the fibers having an average length greater than about 2 mm and an average aspect ratio greater than about 25:1;

(b) causing the starch-based thickening agent and water to interact together to form a fluid fraction that is characterized by a yield stress and viscosity that enables the fibers to be substantially uniformly dispersed throughout the starch-based composition as the fibers and fluid fraction are mixed together; and (c) mixing together the fibers and fluid fraction in order to substantially uniformly disperse the fibers throughout the starch-based composition without substantial further addition of heat to the starch-based composition.

46. A method for dispersing fibers within a starch-based composition comprising the steps of:

(a) combining together water, fibers having an average length of at least about 2 mm and an average aspect ratio of at least about 25:1 and a starch-based thickening agent such that the thickening agent and water interact together to form a fluid fraction having a yield stress greater than about 10 Pa and an apparent viscosity measured at a shear rate of 5 $s^{-1}$ greater that about 3 Pa.s; and (b) mixing together the combined starch-based thickening agent, water, and fibers in order to substantially uniformly disperse the fibers throughout the starch-based composition, the substantially uniformly dispersed fibers having a concentration in a range from about 1% to about 40% by weight of the starch-based composition.

47. A method for dispersing fibers within a starch-based composition comprising the steps of:

(a) combining together water, fibers having an average length of at least about 2 mm and an aspect ratio of at least about 25:1, and a starch-based thickening agent such that the thickening agent and water interact together to form a fluid fraction that is characterized by a yield stress and viscosity that enables the fibers to be substantially uniformly dispersed throughout the starch-based composition as the fibers and fluid fraction are mixed together; and (b) mixing together the combined starch-based thickening agent, water, and fibers in order to substantially uniformly disperse the fibers throughout the starch-based composition, the fibers having a concentration in a range from about 1% to about 40% by weight of the starch-based composition.

48. A method for dispersing fibers within a starch-based composition comprising the steps of
  (a) combining together water, fibers having an average of at least about 2 mm and an aspect ratio of at least about 25:1, and an ungelatinized starch-based thickening agent to form a fibrous slurry;
  (b) heating the fibrous slurry in order to gelatinize the ungelatinized starch-based thickening agent and thereby form a fluid fraction that is characterized by a yield stress and viscosity that enables the fibers to be substantially uniformly dispersed throughout the cellulose-based composition as the fibers and fluid fraction are mixed together, the heating step being performed without any substantial evaporation of water from the fibrous slurry; and
  (c) mixing together the combined cellulose-based thickening agent, water, and fibers in order to substantially uniformly disperse the fibers throughout the cellulose-based composition, the fibers having a concentration in a range from about 1% to about 40% by weight of the starch-based composition.

49. A fibrous composition having substantially uniformly dispersed fibers comprising water, a thickening agent, and fibers having an average length of at least about 2 mm and an average aspect ratio of at least about 25:1, the water and thickening agent together comprising a fluid fraction that is characterized by a yield stress and viscosity that enable the fibers to be substantially uniformly dispersed throughout the fibrous composition as the fibers and fluid fraction are mixed together.

50. A starch-based composition having substantially uniformly dispersed fibers comprising water, a starch-based thickening agent, and fibers having an average length of at least about 2 mm, an average aspect ratio of at least about 25:1 and a concentration in a range from about 1% to about 40% by weight of the starch-based composition, the water and starch-based thickening agent together comprising a fluid fraction having a yield stress greater than about 10 Pa and an apparent viscosity measured at a shear rate of 5 s$^{-1}$ greater that about 3 Pa.s.

51. A starch-based composition having substantially uniformly dispersed fibers comprising water, a starch-based thickening agent, and fibers having an average length of at least about 2 mm and an average aspect ratio of at least about 25:1, the water and starch-based thickening agent together comprising a fluid fraction that is characterized by a yield stress and viscosity that enable the fibers to be substantially uniformly dispersed throughout the starch-based composition as the fibers and fluid fraction are mixed together without any substantial evaporation of the water from the starch-based composition.

52. A fibrous composition having substantially uniformly dispersed fibers formed by the process comprising the steps of:
  (a) combining together water, fibers, and a thickening agent such that the thickening agent and water interact together to form a fluid fraction that is characterized by a yield stress and viscosity that enables the fibers to be substantially uniformly dispersed throughout the fibrous composition as the fibers and fluid fraction are mixed together, the fibers having an average length greater than about 2 mm and an average aspect ratio greater than about 25:1; and
  (b) mixing together the combined thickening agent, water and fibers in order to substantially uniformly disperse the fibers throughout the fibrous composition.

53. A starch-based composition having substantially uniformly dispersed fibers formed by the process comprising the steps of:
  (a) combining together water, fibers, and a starch-based thickening agent such that the thickening agent and water interact together to form a fluid fraction that is characterized by a yield stress and viscosity that enables the fibers to be substantially uniformly dispersed throughout the starch-based composition as the fibers and fluid fraction are mixed together, the fibers having an average length greater than about 2 mm and an average aspect ratio greater than about 25:1; and
  (b) mixing together the combined starch-based thickening agent, water, and fibers in order to substantially uniformly disperse the fibers throughout the starch-based composition, the fibers having a concentration in a range from about 1% to about 40% by weight of the starch-based composition.

54. A starch-based composition having substantially uniformly dispersed fibers formed by the process comprising the steps of:
  (a) combining together water, fibers having an average of at least about 2 mm and an aspect ratio of at least about 25:1, and an ungelatinized starch-based thickening agent to form a fibrous slurry;
  (b) heating the fibrous slurry in order to gelatinize the ungelatinized starch-based thickening agent and thereby form a fluid fraction that is characterized by a yield stress and viscosity that enables the fibers to be substantially uniformly dispersed throughout the cellulose-based composition as the fibers and fluid fraction are mixed together, the heating step being performed without any substantial evaporation of water from the fibrous slurry; and
  (c) mixing together the combined cellulose-based thickening agent, water, and fibers in order to substantially uniformly disperse the fibers throughout the cellulose-based composition, the fibers having a concentration in a range from about 1% to about 40% by weight of the starch-based composition.

\* \* \* \* \*